US012643116B2

(12) United States Patent
Bauer et al.

(10) Patent No.: US 12,643,116 B2
(45) Date of Patent: Jun. 2, 2026

(54) MOTORIZED FLUID SPRAYER

(71) Applicant: Design West Technologies, Inc., Tustin, CA (US)

(72) Inventors: Maria Bauer, Tustin, CA (US); Ryan Hur, Tustin, CA (US); Xiaolin Wang, Tustin, CA (US); Sam De La Torre, Tustin, CA (US); Robert Alan Olson, Tustin, CA (US); Sovan Nguyen, Tustin, CA (US); Rongwei Mao, Tustin, CA (US)

(73) Assignee: Design West Technologies, Inc., Tustin, CA (US)

( * ) Notice: Subject to any disclaimer, the term of this patent is extended or adjusted under 35 U.S.C. 154(b) by 548 days.

(21) Appl. No.: 18/168,456

(22) Filed: Feb. 13, 2023

(65) Prior Publication Data

US 2023/0390794 A1 Dec. 7, 2023

Related U.S. Application Data

(60) Provisional application No. 63/267,903, filed on Feb. 11, 2022.

(51) Int. Cl.
*B05B 9/08* (2006.01)
*B05B 12/00* (2018.01)

(52) U.S. Cl.
CPC .......... *B05B 9/0866* (2013.01); *B05B 9/0888* (2013.01); *B05B 12/0026* (2018.08); *B05B 12/006* (2013.01)

(58) Field of Classification Search
CPC . B05B 9/0866; B05B 9/0888; B05B 12/0026; B05B 12/006
See application file for complete search history.

(56) References Cited

U.S. PATENT DOCUMENTS

| | | | | |
|---|---|---|---|---|
| 4,651,903 | A * | 3/1987 | Pagliai | B05B 9/0888 239/153 |
| 5,199,642 | A * | 4/1993 | Rankin | B05B 9/01 239/443 |
| 10,124,355 | B1 * | 11/2018 | Wirz Luchsinger | B05B 9/0861 |
| 11,135,621 | B2 * | 10/2021 | Liu | B08B 13/00 |
| 11,406,995 | B2 * | 8/2022 | Jurmu | B05B 12/00 |
| 12,128,439 | B1 * | 10/2024 | Xu | B05B 9/0403 |
| 2006/0131151 | A1 * | 6/2006 | Marchand | B08B 3/026 200/336 |
| 2008/0251607 | A1 * | 10/2008 | Krayer | B05B 7/0081 239/290 |
| 2011/0121103 | A1 * | 5/2011 | Carleton | B05B 1/3046 251/366 |

(Continued)

*Primary Examiner* — Joseph A Greenlund
(74) *Attorney, Agent, or Firm* — Inskeep IP Group, Inc.

(57) ABSTRACT

A portable motorized fluid sprayer device is described, having a fluid tank and a pump manifold configured to pump fluid from the tank and into a connected fluid conveying structure (e.g., a hose, wand, nozzle, handle and/or similar structures). The manifold may include an electric motor, a gear pump, a controller, and a battery. Additionally, the fluid sprayer device may allow for spraying fluid with consistent pressure, recirculation of fluid within the tank, a gear pump for spraying or suctioning fluid from the fluid conveying structure, a safety lever, the ability to separate the pump manifold from the fluid tank, and other features.

24 Claims, 18 Drawing Sheets

(56) References Cited

U.S. PATENT DOCUMENTS

| | | | | |
|---|---|---|---|---|
| 2013/0020350 | A1* | 1/2013 | Gardos | A01M 3/00 222/113 |
| 2013/0186977 | A1* | 7/2013 | Fornaro | B05B 9/0888 239/127 |
| 2013/0277455 | A1* | 10/2013 | Thompson | B05B 9/0866 239/289 |
| 2015/0102121 | A1* | 4/2015 | Dey | B05B 9/01 239/69 |
| 2015/0209835 | A1* | 7/2015 | Heuckeroth | B05B 7/265 239/128 |
| 2017/0239676 | A1* | 8/2017 | Kristensen | B05B 12/00 |
| 2017/0252771 | A1* | 9/2017 | Young, II | B05C 11/1005 |
| 2017/0282219 | A1* | 10/2017 | Kloepfer | B08B 3/026 |
| 2017/0320081 | A1* | 11/2017 | Heuckeroth | B05B 9/03 |
| 2018/0111146 | A1* | 4/2018 | Strong | B05B 12/085 |
| 2018/0290165 | A1* | 10/2018 | Herman | B05B 12/004 |
| 2019/0060928 | A1* | 2/2019 | Gutsmann | A01M 7/0046 |
| 2019/0143353 | A1* | 5/2019 | Wirz Luchsinger | B05B 9/085 239/152 |
| 2019/0388918 | A1* | 12/2019 | Gustafson | B05B 9/0861 |
| 2019/0388923 | A1* | 12/2019 | Giacalone | B05B 12/00 |
| 2020/0001313 | A1* | 1/2020 | Bindl | B05B 12/006 |
| 2022/0134369 | A1* | 5/2022 | Gustafson | B05B 9/0861 239/11 |
| 2023/0390794 | A1* | 12/2023 | Bauer | B05B 12/08 |

* cited by examiner

FIG.6
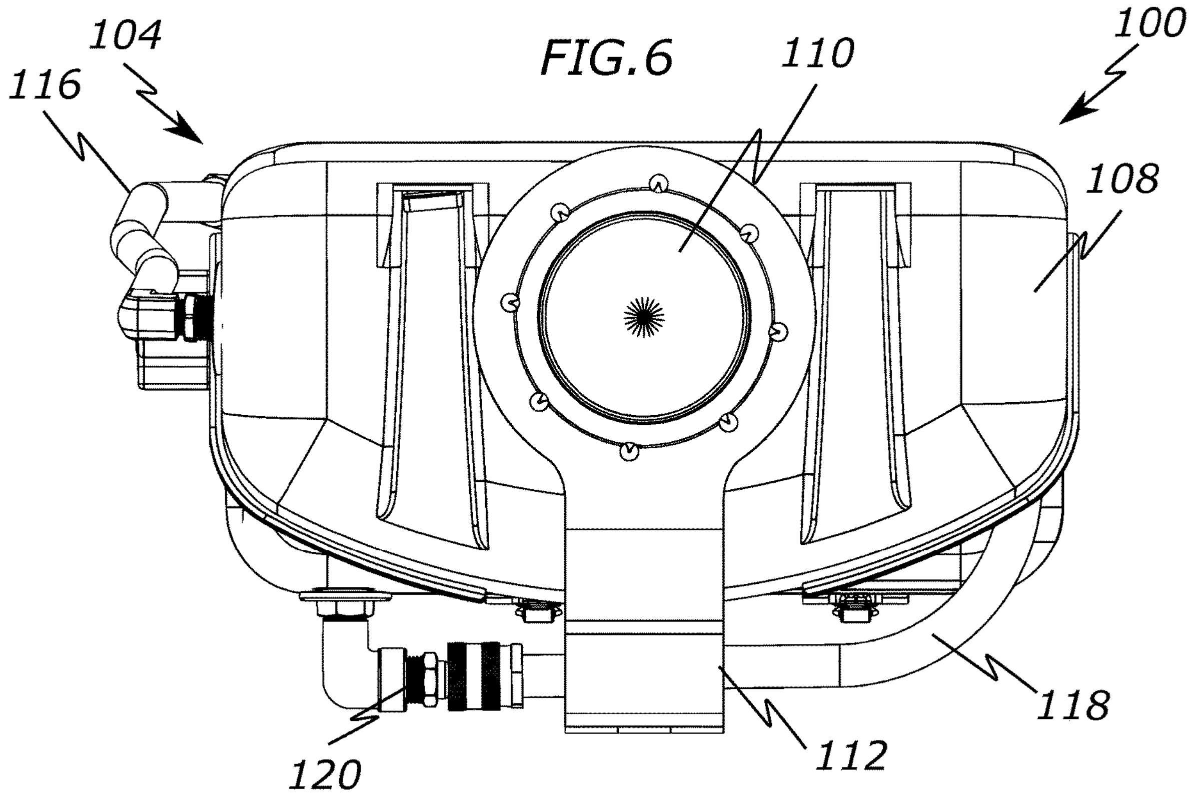
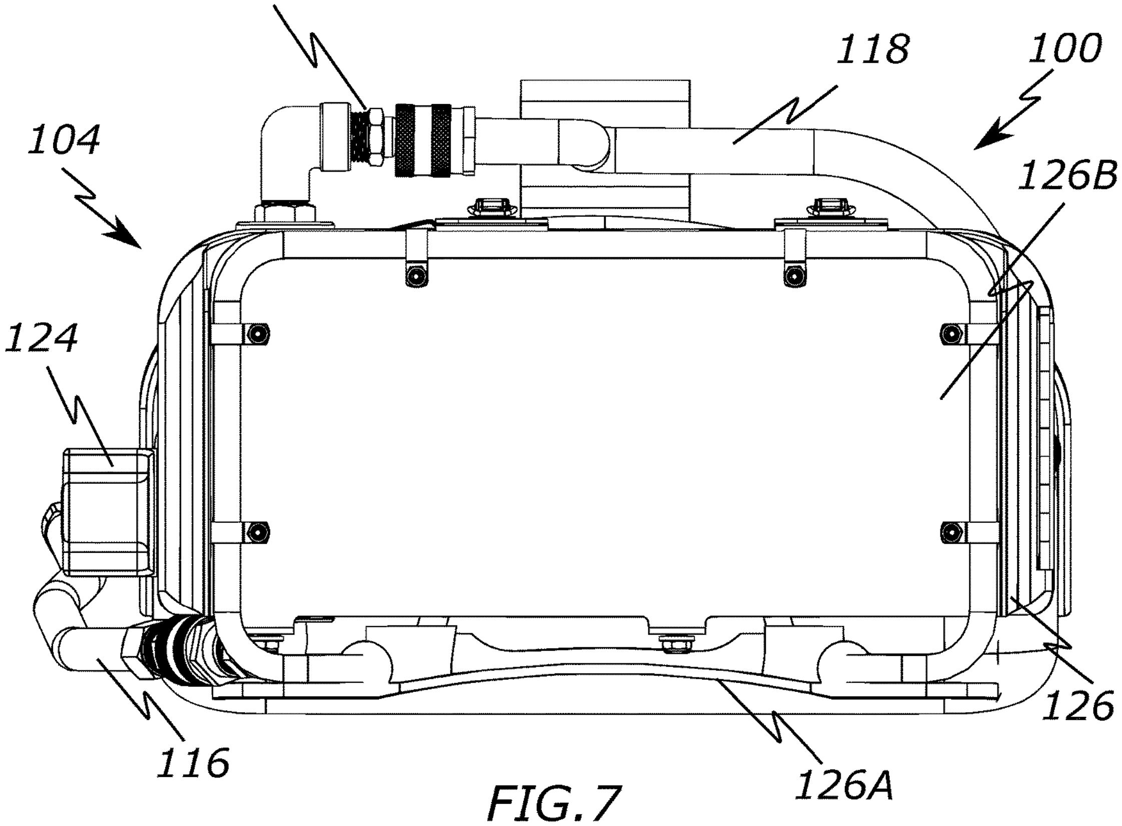
FIG.7

FIG.9
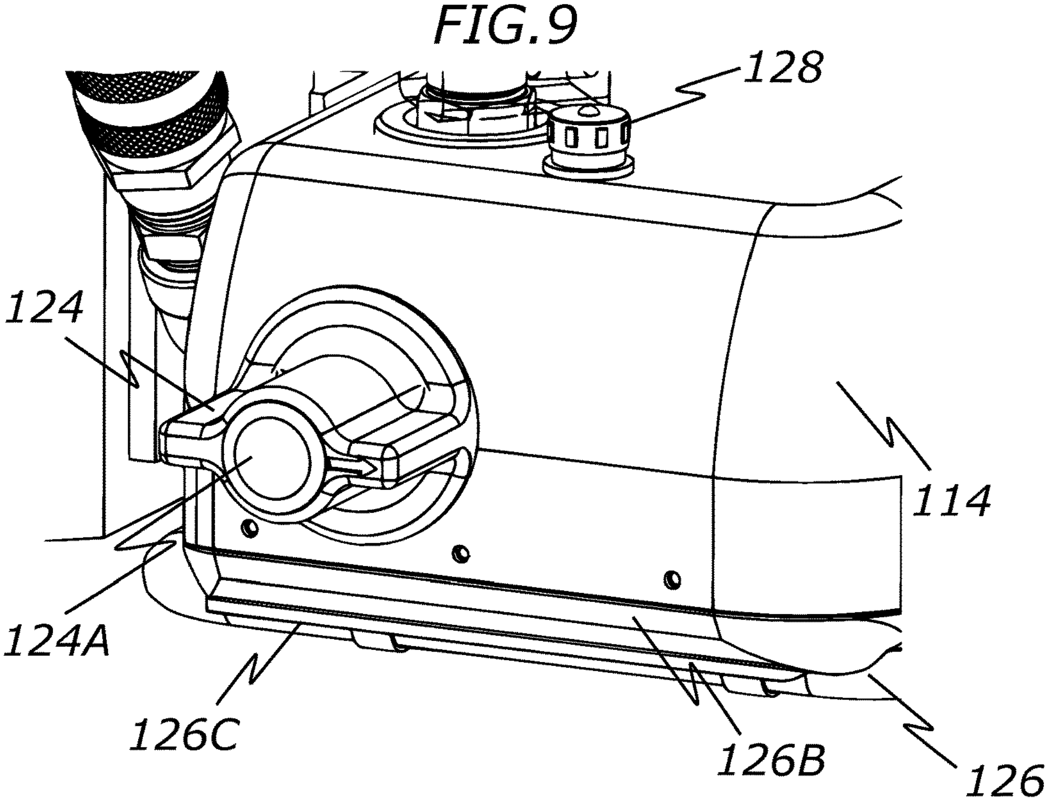
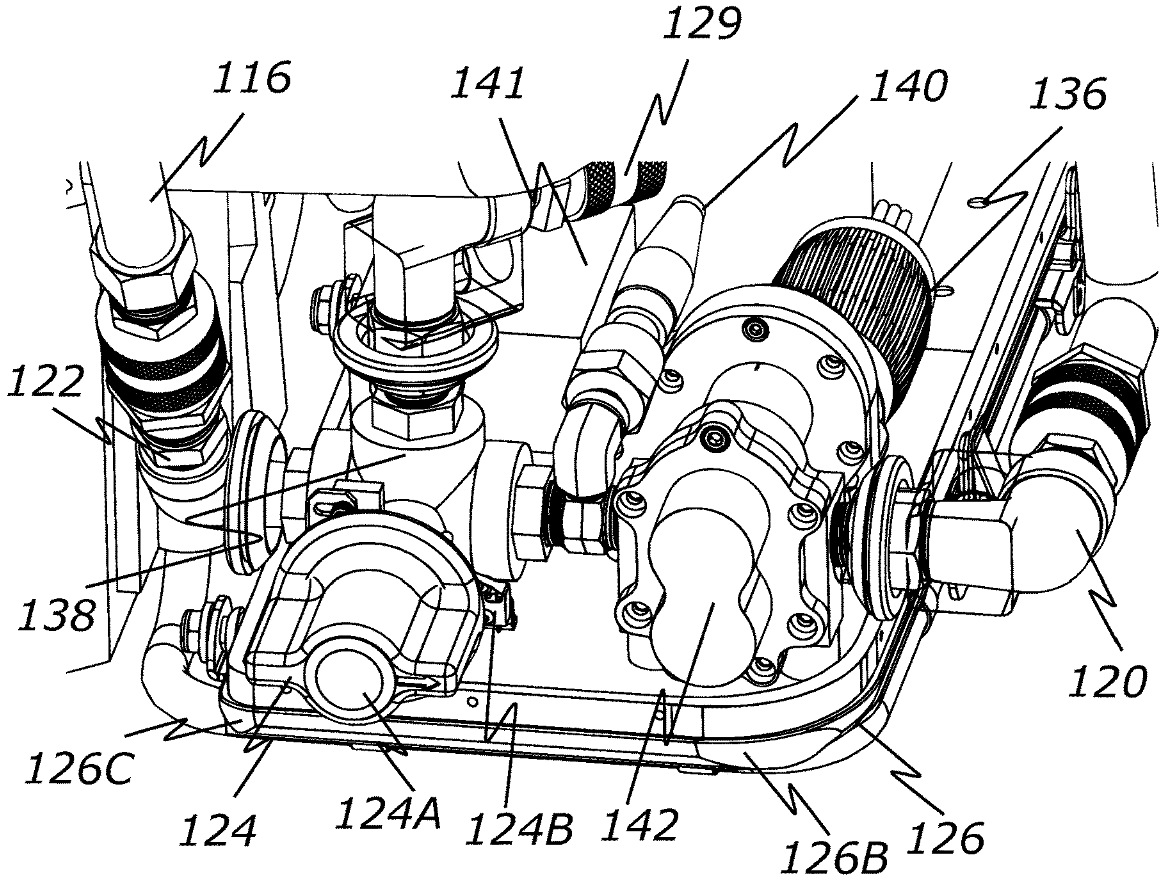
FIG.10

FIG.13
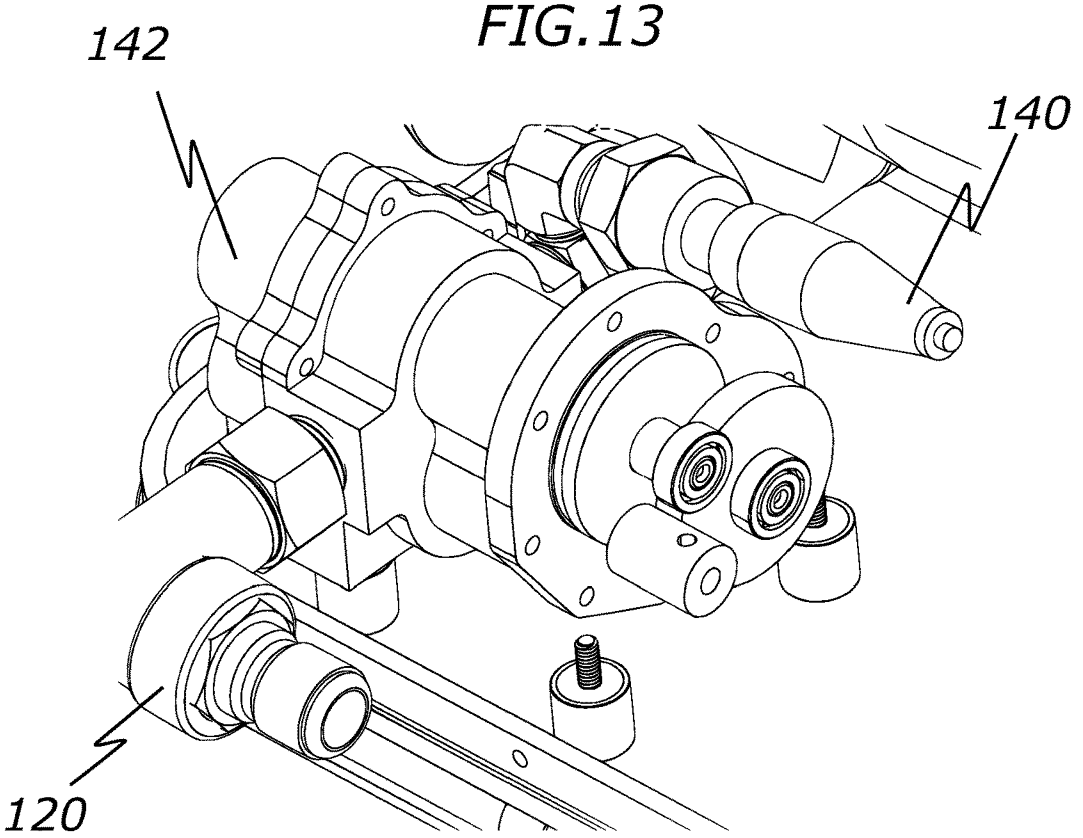
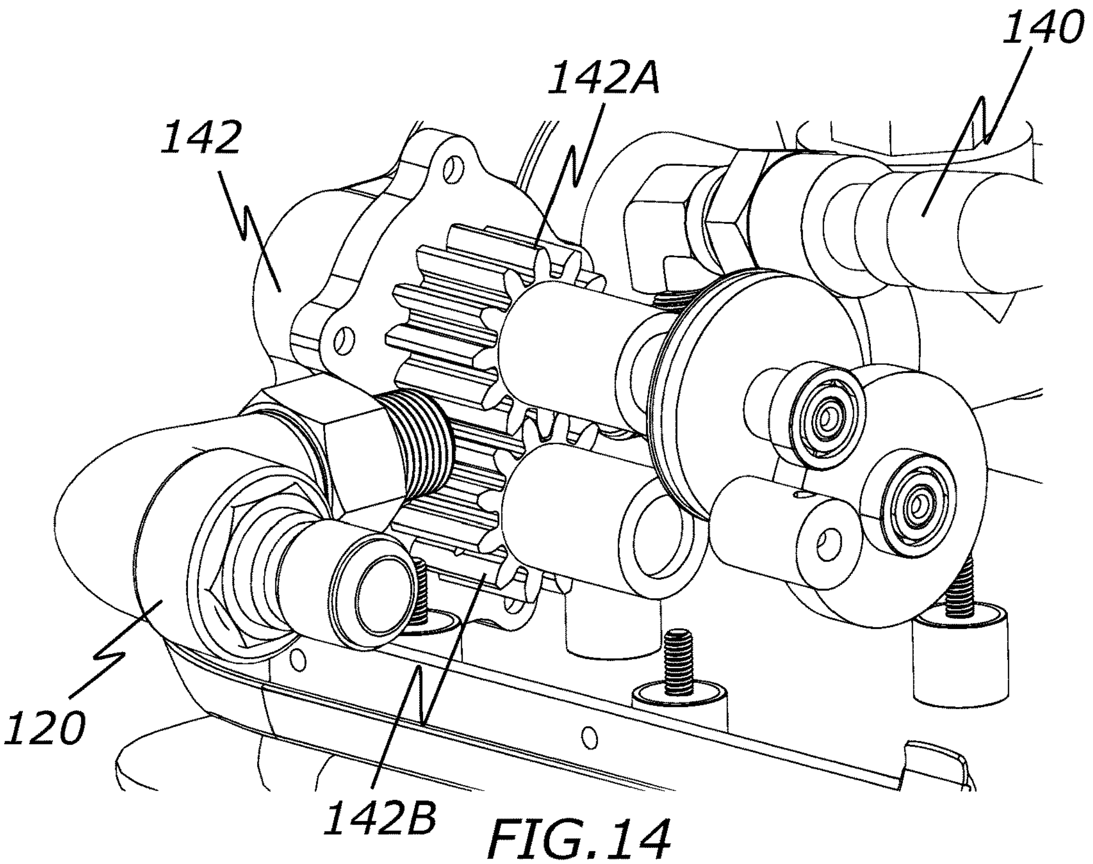
FIG.14

MOTORIZED FLUID SPRAYER

RELATED APPLICATIONS

This application claims benefit of and priority to U.S. Provisional Application Ser. No. 63/267,903 filed Feb. 11, 2022 entitled Man Portable Decontamination Sprayer, which is hereby incorporated herein by reference in its entirety.

BACKGROUND OF THE INVENTION

Portable motorized fluid sprayers are used to distribute a variety of different fluids for many different purposes. For example, some portable motorized fluid sprayers may be used to spray water or chemicals, such as pesticides. Some portable motorized fluid sprayers are relatively small and may fit on a user's back while other portable motorized fluid sprayers may be somewhat larger and therefore too large for mounting on a human.

Most motorized fluid sprayers are intended for home or commercial uses and therefore are often not suitable for more demanding military use. For example, military equipment may sometimes be deployed from aircraft to areas without power infrastructure and is sometimes used with decontamination solutions. Hence, what is needed is an improved motorized fluid sprayer that is better equipped to operate with military usage.

SUMMARY OF THE INVENTION

In some aspects, the techniques described herein relate to a portable motorized fluid sprayer including: a fluid tank configured to contain fluid; and, a pump manifold including a pump, an electric motor operatively coupled to the pump, and a controller operatively connected to the electric motor; and, a fluid conveying structure hydraulically connected to the pump; wherein the controller is configured to operate the motor to pump fluid from the fluid tank out of the fluid conveying structure.

In some aspects, the techniques described herein relate to a portable motorized fluid sprayer, wherein the pump is a gear pump.

In some aspects, the techniques described herein relate to a portable motorized fluid sprayer, wherein the pump manifold is removably connected to the fluid tank.

In some aspects, the techniques described herein relate to a portable motorized fluid sprayer, further including a support structure removably connecting the fluid tank to the pump manifold.

In some aspects, the techniques described herein relate to a portable motorized fluid sprayer, wherein the support structure includes a bracket or shelf and wherein the pump manifold is connected to the support structure via one or more of latches, mating grooves, mating pins/holes, screws, and bolts.

In some aspects, the techniques described herein relate to a portable motorized fluid sprayer, wherein the support structure is permanently fixed to the fluid tank or is removably connected to the fluid tank.

In some aspects, the techniques described herein relate to a portable motorized fluid sprayer, wherein the pump manifold is configured to drain fluid from a fluid container when disconnected from the support structure and the fluid tank.

In some aspects, the techniques described herein relate to a portable motorized fluid sprayer, wherein the fluid tank is at least partially composed of flexible material and may have an expanded configuration and a compressed configuration that is thinner than the expanded configuration.

In some aspects, the techniques described herein relate to a portable motorized fluid sprayer, wherein the pump manifold has a first mode of operation spraying fluid from the fluid tank out of the fluid conveying structure, and a second mode of operation suctioning fluid from the fluid conveying structure into the fluid tank.

In some aspects, the techniques described herein relate to a portable motorized fluid sprayer, wherein the pump manifold has a first mode of operation spraying fluid from the fluid tank out of the fluid conveying structure, a second mode of operation recirculating fluid from a first opening of the fluid tank to a second opening of a fluid tank.

In some aspects, the techniques described herein relate to a portable motorized fluid sprayer, wherein the pump manifold is configured to pump fluid a predetermined pressure to the fluid conveying structure without regard to a viscosity of the fluid.

In some aspects, the techniques described herein relate to a portable motorized fluid sprayer, wherein the pump manifold further includes an inline pressure sensor arranged to sense pressure within a hydraulic passage of the pump manifold.

In some aspects, the techniques described herein relate to a portable motorized fluid sprayer, wherein the fluid conveying structure further includes a handle having a trigger and a trigger sensor configured to sense a position of the trigger; wherein the controller adjusts a speed of the electric motor based on trigger sensor data from the trigger sensor and from pressure sensor data from the inline pressure sensor.

In some aspects, the techniques described herein relate to a portable motorized fluid sprayer, wherein the handle further includes a safety lever; wherein the controller prevents spraying from the fluid conveying structure until the safety lever is actuated.

In some aspects, the techniques described herein relate to a portable motorized fluid sprayer, wherein the handle further includes a safety lever; wherein the safety lever removably engages a portion of the trigger to maintain a position of the trigger until the safety lever is depressed.

In some aspects, the techniques described herein relate to a portable motorized fluid sprayer, wherein the handle further includes a maximum flow rate interface; wherein the controller limits a maximum flow rate during spraying from the fluid conveying structure based on a position of the maximum flow rate interface.

In some aspects, the techniques described herein relate to a portable motorized fluid sprayer, wherein the handle further includes a flow rate knob having a shoulder portion that moves closer to or away from a portion of the trigger so as to limit a maximum position of the trigger.

In some aspects, the techniques described herein relate to a portable motorized fluid sprayer, wherein the controller adjusts a direction of rotation of the electric motor based on trigger sensor data from the trigger sensor.

In some aspects, the techniques described herein relate to a portable motorized fluid sprayer, wherein moving the trigger closer to the handle causes the portable motorized fluid sprayer to spray out fluid from the fluid conveying structure and wherein moving the trigger away from the handle causes the portable motorized fluid sprayer to suction fluid into the fluid conveying structure.

In some aspects, the techniques described herein relate to a portable motorized fluid sprayer, further including two shoulder straps configured to support the portable motorized fluid sprayer on a back of a user.

In some aspects, the techniques described herein relate to a method of operating a portable motorized fluid sprayer, including: sensing a position of a trigger of the portable motorized fluid sprayer; converting the sensed position of the trigger to an intended fluid pressure value; measuring pressure within a hydraulic passage of the portable motorized fluid sprayer; and, activating and adjusting a speed of a pump of the portable motorized fluid sprayer until the pressure within the hydraulic passage reaches the intended fluid pressure value.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which

FIG. 6 is a top view of the fluid sprayer device of FIG. 1.

FIG. 7 is a bottom view of the fluid sprayer device of FIG. 1.

FIG. 9 is an enlarged view of the fluid sprayer device of FIG. 1.

FIG. 10 is an internal view of the fluid sprayer device of FIG. 1.

FIG. 13 is an internal view of the fluid sprayer device of FIG. 1.

FIG. 14 is an internal view of the fluid sprayer device of FIG. 1.

DETAILED DESCRIPTION

Figure 1:
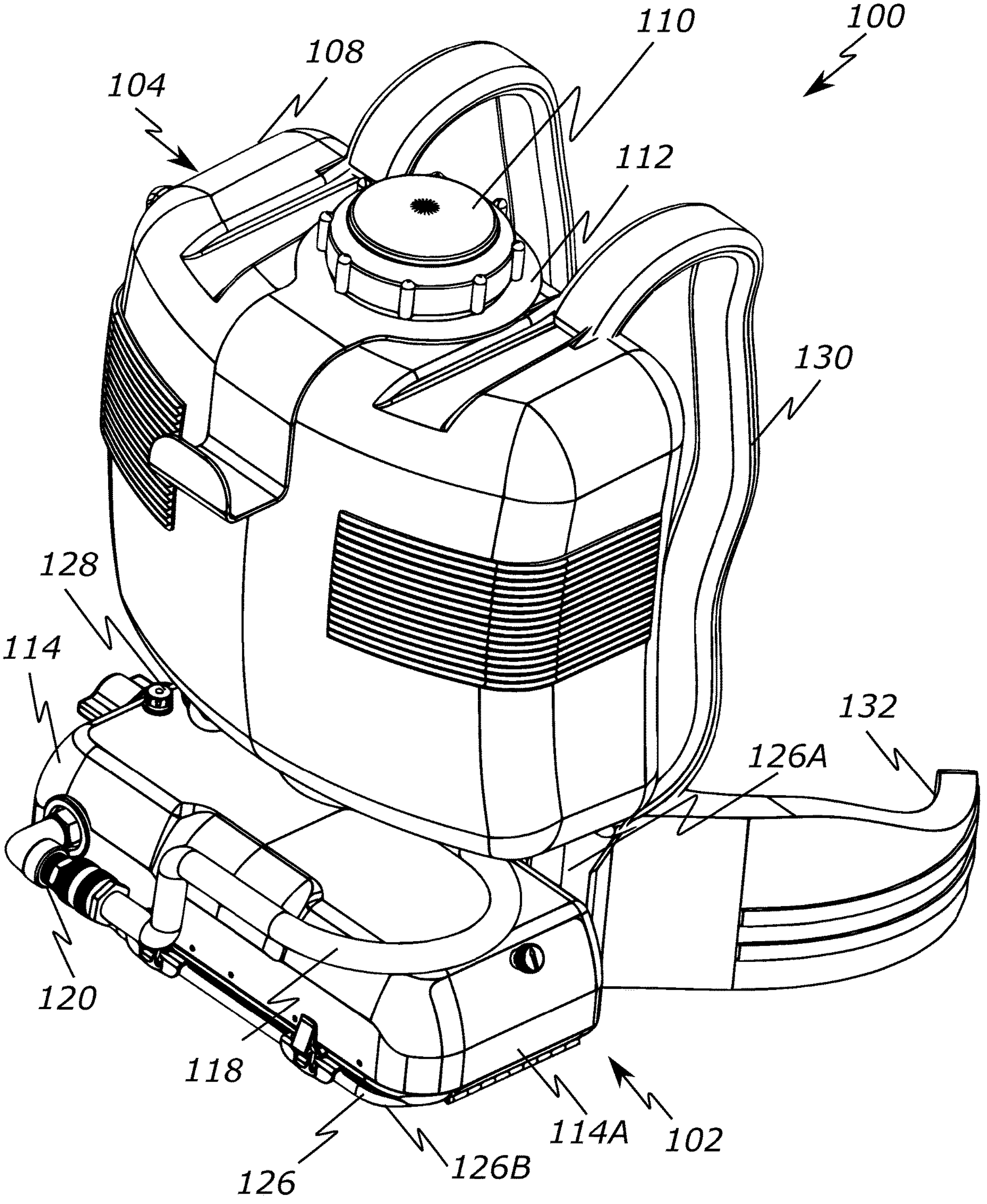
FIG. 1 is a perspective view of a fluid sprayer device.
Figure 2:
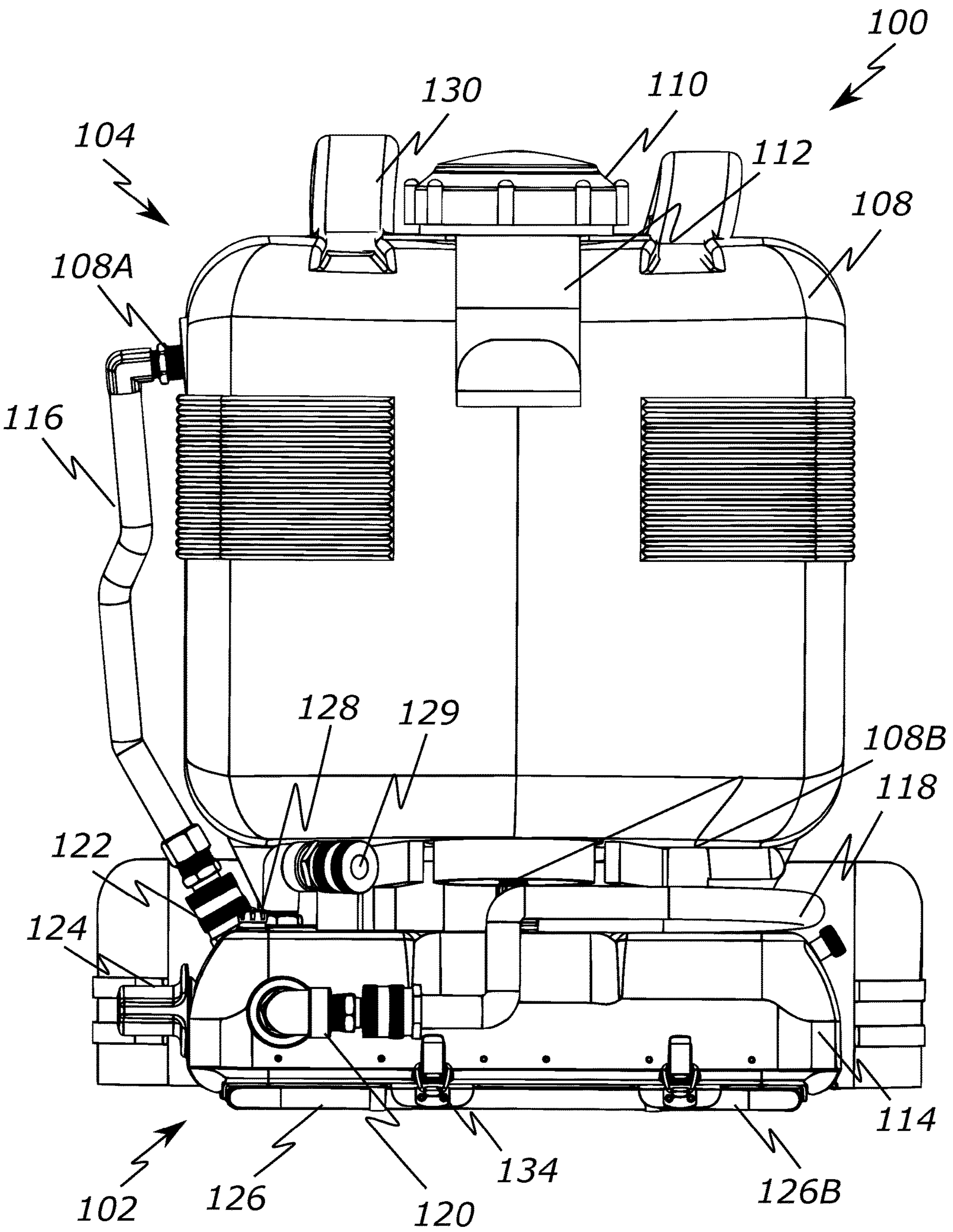
FIG. 2 is a front view of the fluid sprayer device of FIG. 1.
Figure 3:
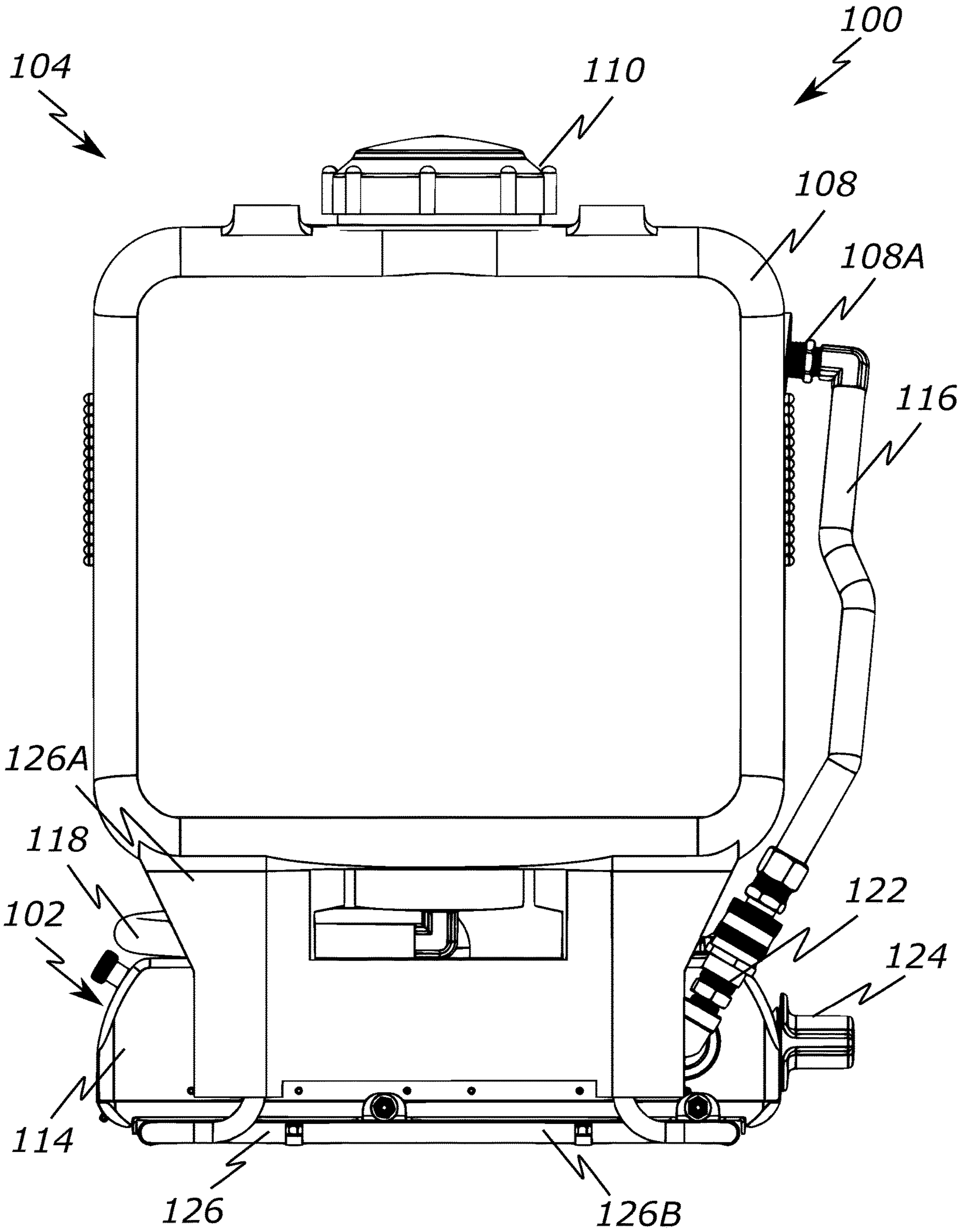
FIG. 3 is a back view of the fluid sprayer device of FIG. 1.
Figure 4:
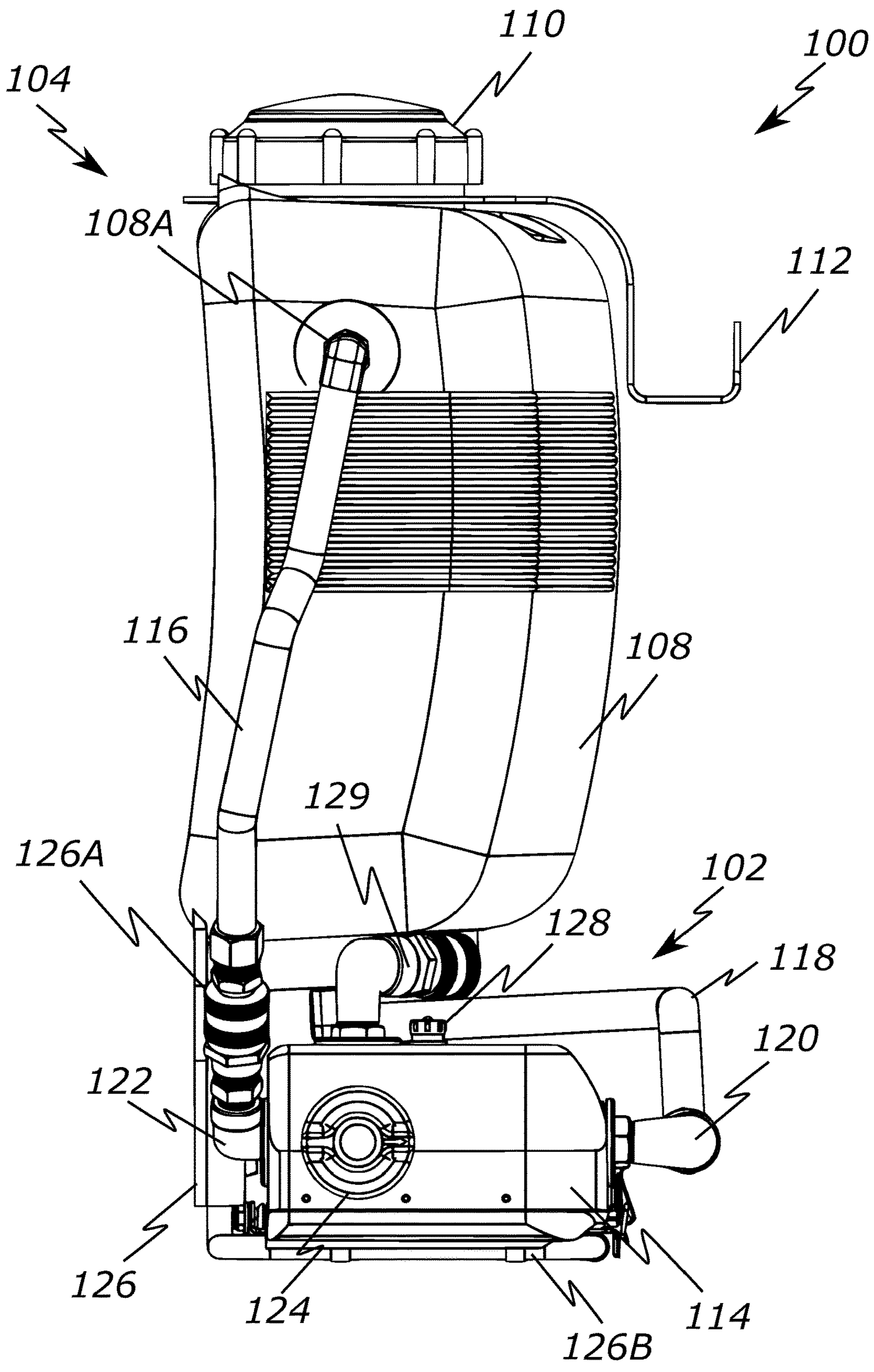
FIG. 4 is a side view of the fluid sprayer device of FIG. 1.
Figure 5:
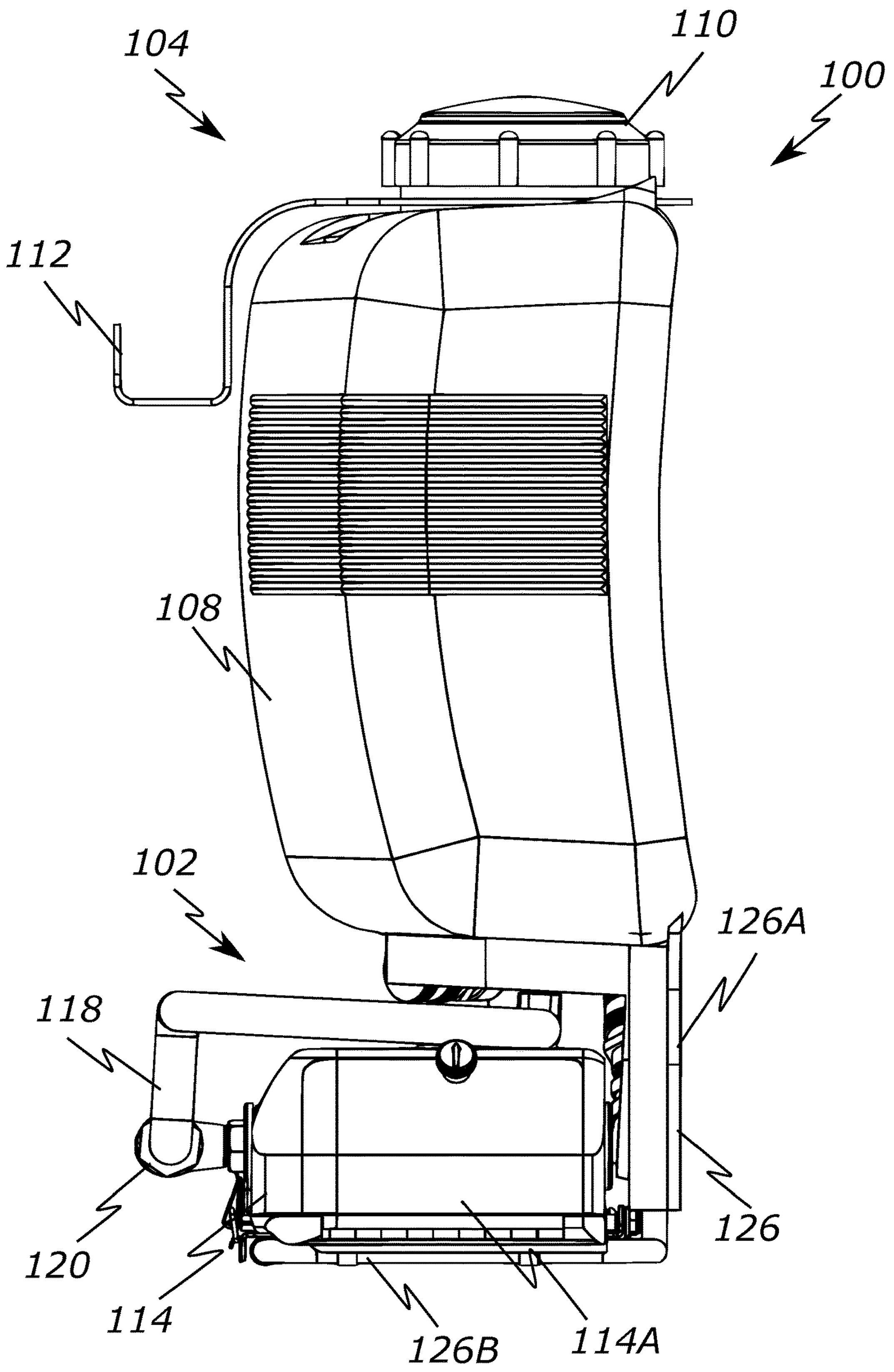
FIG. 5 is a side view of the fluid sprayer device of FIG. 1.
Figure 8:
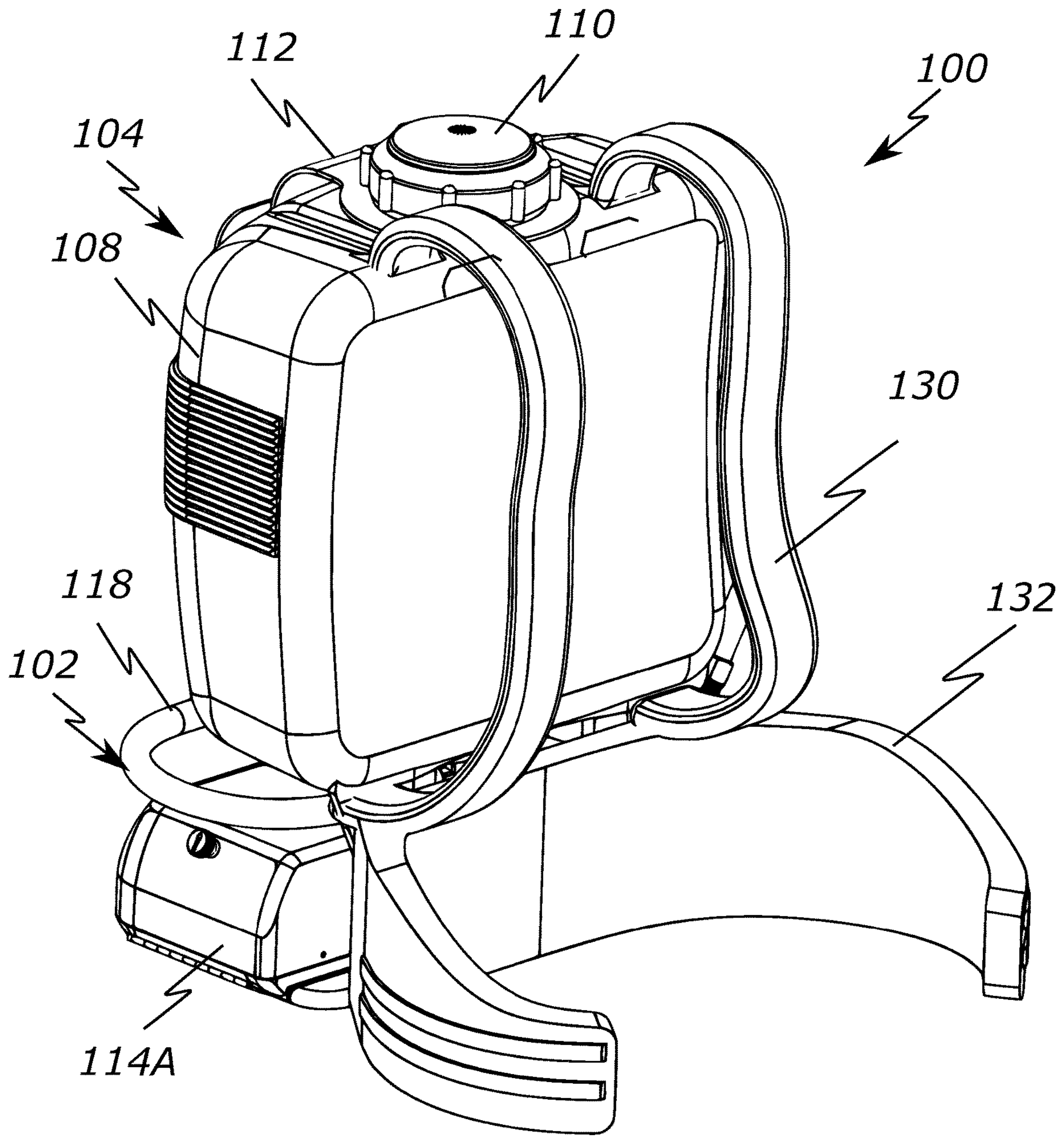
FIG. 8 is a perspective view of the fluid sprayer device of FIG. 1 with shoulder straps.
Figure 11:
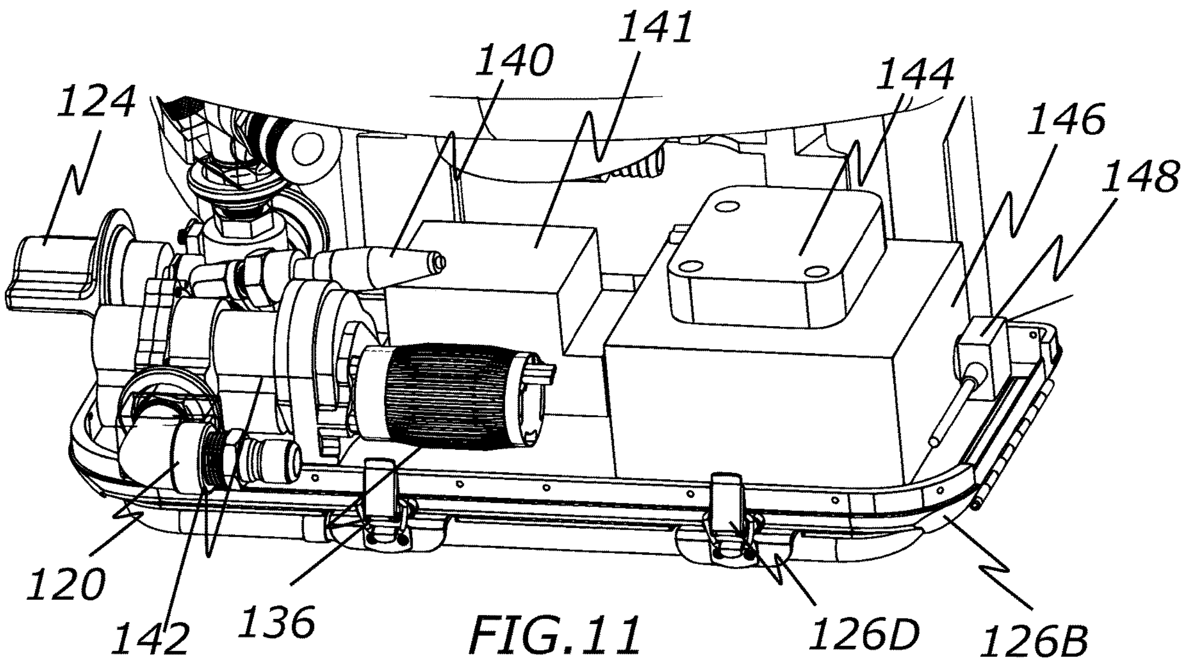
FIG. 11 is an internal view of the fluid sprayer device of FIG. 1.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

While different embodiments may be described in this specification, it is specifically contemplated that any of the features from different embodiments can be combined together in any combination. In other words, the features of different embodiments can be mixed and matched with each other. Hence, while every permutation of features from different embodiments may not be explicitly shown, it is the intention of this specification to cover any such combinations.

This specification is generally directed to portable motorized fluid sprayers and methods of operation. Aspects of these portable motorized fluid sprayers may be useful in many different home and commercial environments, as well as particularly useful for military usage and environments.

For example, in the context of military usage, portable motorized fluid sprayers are sometimes used in remote locations, such as areas in proximity to combat. In that respect, such devices may be deployed out of land or aerial vehicles and may receive at least some impact. Additionally, remote locations often lack infrastructure, such as a supply of power or fuel, that may be used to continuously operate some devices.

Further, portable motorized fluid sprayers are sometimes used to apply chemicals with extreme properties, such as very high pH, very low pH, or chemicals with other potentially harmful side effects. For example, some decontamination solutions such as U.S. DoD Joint General Purpose Decontaminant (M333), have a relatively high pH while others, such as Clear Scientific Decontamination Slurry, may have a relatively low pH. Additionally, some fluids (e.g., decontamination solutions) may take the form of a slurry and therefore the solute can settle at the bottom of a tank of a sprayer over time. For example, some decontamination slurry contains abrasive slurry particles such as zirconium hydroxide. Similar problems may also present themselves in some commercial and home environments as well.

The features and embodiments described in this specification may be helpful in addressing some of these issues, as well as other issues.

Generally, the present specification includes a portable motorized fluid sprayer having a fluid tank and a manifold configured to pump fluid from the tank and into a connected fluid conveying structure (e.g., a hose, wand, nozzle, handle and/or similar structures). In one example, a manifold or pump manifold is defined as a structure that includes at least some components, but not necessarily all components, responsible for pumping fluid from the fluid tank and into the fluid conveying structure. In one example, the manifold may include an electric motor, a gear pump, a controller, and a battery (or an external power supply, such as a gas powered electrical generator).

The motorized fluid sprayer may be configured to be modular such that the manifold and its attached fluid conveying structure are removable and separable from the fluid tank. This allows the manifold to be separated and used with a different tank (e.g., a larger or different tank) if needed. Hence, the more expensive manifold portion may be cleaned and/or decontaminated and then reused with another tank, especially if the initial tank must be discarded. For example, the fluid tank may include a support structure, such as a bracket or shelf, onto which the manifold removably mounts. The manifold may be releasably secured with a variety of features, such as latches, mating grooves, mating pins/holes, screws, bolts, or any combination of these features. In one example, the support structure may form an "L" shaped shelf such that the manifold may be mounted to a relatively horizontal shelf portion. Alternatively, the manifold may be removably connected directly to the tank via an attachment mechanism (e.g., a rail and latch mechanism directly on the tank and manifold). The support structure may be permanently or removably fixed to the tank.

The fluid conveying structure (e.g., a hose, wand, nozzle, handle, and/or similar structures) may include several features that improve use and performance of the motorized fluid sprayer.

In one example, the motorized fluid sprayer is configured to deliver fluid through the fluid conveying structure at certain pressures without regard to the viscosity of the fluid. Hence, a user may be able to spray relatively high viscosity fluid (e.g., slurry), relatively low viscosity fluid (e.g., a water), or other fluids of various viscosities or other characteristics at the same pressure level. Additionally, this may be achieved with similar user actuation (e.g., the user depressing a lever to the same position results in the same pressure without regard to fluid viscosity).

In one example, the pressure regulation may be achieved with a fluid conveying structure that may include a handle with a user actuated fluid interface control connected to an electronic sensor. The fluid interface control may be a lever, a slider, a switch, one or more buttons, a thumbwheel, knob, or similar mechanisms that allow user input and adjustment. The electronic sensor may be one of a variety of different sensors, such as a Hall effect sensor that senses a position of a magnet connected to the fluid interface control such that as the user interface control is moved, the magnet also moves, which allows the Hall effect sensor to sense a change in the strength of the magnetic field of the magnet. While a variety of different sensor types are possible, a Hall effect sensor may be helpful at maintaining accurate sensor readings in the event that fluid penetrates near the sensor and/or fluid interface control. The Hall effect sensor may be used with a diametrically magnetized magnet (e.g., a cylindrical magnet with an axis along its length) that allows for simple mounting in the trigger while generating a simple magnetic field, allowing for a simple algorithm for positional detection of magnet versus hall sensor. Alternatively, an axially magnetized magnet may be used.

The electronic sensor senses the position of the fluid interface control and sends an electronic signal (e.g., an analog or digital signal) to a controller that controls the pressure of the fluid pumped out of the pump manifold. The controller may be electrically connected to an inline pressure sensor that senses pressure within the manifold fluid conduit connected to the fluid passage within the fluid conveying structure. The controller may also be electrically connected to an electric motor that is coupled to drive a pump that is also connected to the manifold fluid conduit connected to the fluid passage within the fluid conveying structure. Hence, the controller can receive electronic sensor signals and adjust the speed (and direction) of the electric motor to provide a specific fluid pressure to the fluid conveying structure. The controller therefore may include a table or formula stored in memory that looks up or converts a signal from the electronic sensor to a specific fluid pressure value sensed by the inline pressure sensor.

In another example aspect, a handle of the fluid conveying structure may include a safety control that must be activated for the fluid interface control to actuate fluid pumping via the pump manifold. If potentially hazardous or dangerous fluids are being used, the safety control helps prevent accidental discharge of that fluid. The safety control may be a variety of different mechanisms, such as a lever, switch, button, thumbwheel, slider, or similar mechanism. The safety control may also include an electric sensor in communication with the controller, and may also be a Hall effect sensor (e.g., with a magnet in the safety control) or other type of sensor.

In another example aspect, the fluid conveying structure may include a valve located within its fluid passage that allows fluid to flow out of the passage from the end of the fluid conveying structure when under pressure but otherwise closes when not under pressure. This may prevent fluid leftover in its passage from dripping from the fluid conveying structure, which may be helpful in circumstances when potentially damaging or hazardous chemicals are used with the motorized fluid sprayer. In that respect, the valve may be included in a handle portion or in a removable end nozzle attachment. The valve may be a ball valve, duck-bill valve, or similar type of valve. If located in the end nozzle attachment, this location allows the user to remove the valve when refilling the tank via the fluid conveying structure and handle.

In another example aspect, the motorized fluid pump may include a battery status indicator that communicates a charge level of a battery (e.g., a battery within and powering the pump manifold). The battery status indicator may be located on a handle of the fluid conveying structure, on the pump manifold, or on the fluid tank. The battery status indicator may be in electrical communication with the controller which powers and manipulates the battery status indicator to communicate a battery charge level. The battery status indicator may be a numerical display (e.g., LCD, transflective LCD, E-ink), a plurality of lights (e.g., an array of LEDs), or similar displays. This display may also be used for other information, such as the fluid pump's status (e.g., a ready status, a spray/fill status, or a recirculation status), pressure levels, temperature levels, fluid level in the tank, instructions, or similar information.

In another example aspect, the motorized fluid pump is reversible such that the opening/nozzle of the fluid conveying structure may be placed into fluid and that fluid sucked into the fluid tank. In examples where the motorized fluid pump is worn on the user's back (i.e., man-portable), such as similar to a backpack, the motorized fluid pump may be left on the user's back during a refilling process rather than removing the motorized fluid pump. This may allow faster refilling of the fluid tank and decrease the likelihood of spilling fluid when refilling. Further, the filled fluid tank is much heavier than an empty fluid tank and therefore a user may be able to more easily move an empty fluid pump to their back and then fill the fluid tank as opposed to moving a full fluid pump on their back. In one example, the previously described fluid interface control may be actuated to activate the pump mechanism in reverse. For example, if the fluid interface control is a lever, the lever may be moved in an opposite direction for fluid suction as opposed to fluid delivery.

In another example aspect, the pump manifold may include a gear pump driven by an electric motor. For example, the gear pump may include a housing and a single gear or two or more gears that are rotated to drive fluid flow. The gear pump may allow the pump manifold to reliably reverse directions (e.g., to provide fluid delivery or fluid suction into the fluid tank), may allow the pump to run without fluid (which can be helpful for cleaning purposes), and may be more resistant to harsh chemicals within the pumped fluid.

In another example aspect, the motorized fluid pump may be configured with a recirculation mode that recirculates fluid from the fluid tank, through the pump, and back into the fluid tank. This can be helpful with fluid in the tank that has a tendency to settle or that may otherwise need periodic mixing (e.g., a slurry). For example, the pump manifold may include a switch that switches a valve such that a fluid passage out of the pump may then be in communication with the fluid tank (e.g., the pump drains from one portion of the fluid tank and delivers fluid to another portion of the fluid tank). Hence, the fluid may be recirculated from and back into the fluid tank. The controller may be in communication with the switch and therefore aware of when it is set to the recirculate mode and therefore activate the pump to a desired pumping/pressure level, or the fluid interface control may be used to activate the recirculation.

The motorized fluid pump may also include one or more sensors at or near the fluid tank or fluid pathway. The one or more sensors may include temperature sensors, shock sensors, pressure sensors, capacitive sensors that sense conditions such as fluid level from an outside of the fluid tank and away from any harsh chemicals, or similar sensors. These sensors may be monitored by the controller and if, for example, the fluid solution stability conditions are exceeded (e.g., decontamination solution), the user can be made aware of potential decay or inefficiency of the decontaminant via a display audible alert or light (LED). In another example, if a fluid level sensor is provided for the fluid tank, refilling the tank via pump suction can be stopped as fluid reaches a top of the tank (e.g., the controller may monitor the level sensor and stop fluid suction into the tank). In addition, chemical, biological, or radio-nuclear sensors can also be integrated into the motorized fluid pump to alarm the user in case of a threat. While a hazard is likely expected during some hazardous usage and PPE is likely worn, notification and optional identification of the threat can aid the user to apply proper precaution and select appropriate decontamination steps and solutions.

In another example aspect, the fluid tank of the motorized fluid pump may be rigid or may be collapsible. In the case of a collapsible fluid tank, the tank may comprise a flexible material, such as a flexible plastic that, when empty, can be compressed to a smaller thickness (e.g., a generally flat or partially flat shape). This may allow the motorized fluid pump to occupy less space when not in use, which may be helpful when being stored or transported. Additionally, the smaller footprint may allow a user to more easily replace the tank with another tank without cross contamination.

Figure 26:
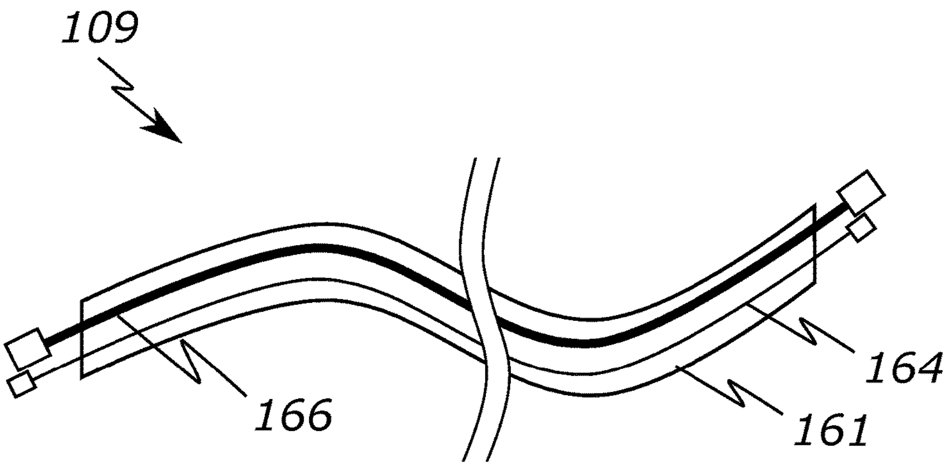
FIG. 26 is a view of a fluid conveying structure.

FIGS. 1-24 illustrate various views of a motorized fluid pump 100 that may include one or more of the previously described features. The motorized fluid pump 100 generally includes a pump manifold 102 (FIGS. 1-16), a fluid tank assembly 104 (FIGS. 1-16), a handle assembly 106 (FIGS. 17-20), a nozzle extension 107, and a fluid conveying structure 109 (FIG. 26). Generally, the fluid tank assembly 104 stores a fluid and the pump manifold pumps that fluid through the attached fluid conveying structure, through the handle assembly 106, and out the nozzle extension 107 (optionally a nozzle may be attached directly to the handle assembly 106).

The fluid tank assembly 104 include a fluid tank 108 with an internal cavity for containing fluid. The fluid tank 108 may have an opening 110 at its top surface that is sized to allow a user to pour fluid into the cavity of the fluid tank 108 and which can be closed with a removable lid or cap that may include an air passage through its top to allow pressure equalization within the fluid tank 108 during use (e.g., air may enter or exit via the cap depending on whether the fluid pump is spraying or refilling the tank).

The fluid tank 108 may also include another opening 108B which may be removably connected to the pump manifold 102, as discussed later in further detail. The opening 108B may be located at a lower portion of the fluid tank 108 such as a bottom surface or lower side surface, or at other locations such as an upper portion of the fluid tank 108 with a tube extending internally to a location near a bottom of the cavity of the fluid tank 108.

The fluid tank 108 may further include another opening 108A for accepting recirculated fluid drawn from the opening 108B, as discussed later in further detail. The opening 108A may be located at an upper portion of the fluid tank 108, such as an upper side as seen in the figures.

The fluid tank 108 may be rigid or may be rigid or may be partially or fully collapsible (e.g., capable of reducing its dimensions, such as thickness). In the case of a collapsible fluid tank, the tank may comprise a flexible material, such as a flexible plastic with an outer fabric layer that, when empty, can be at least partially compressed to a smaller thickness (e.g., a generally flat or partially flat shape). This may allow the motorized fluid pump to occupy less space when not in use, which may be helpful when being stored or transported. In one example, the flexible tank may include rigid structural supports connected with a rugged fabric and sealing layer.

The fluid tank 108 may further include a mixer within the cavity of the fluid tank 108. For example, the mixer may include a motor connected to a mixing structure (e.g., a helical mixing screw) that rotates within the cavity of the fluid tank 108.

The fluid tank 108 may further include one or more heating elements on or within the cavity of the tank 108 (e.g., embedded or otherwise connected to a wall or baffle within the tank 108). In combination with a temperature sensor on or in the cavity of the tank 108, the tank temperature may be monitored and heated to maintain a fluid at a desired temperature (e.g., but the controller assembly 144). This may be helpful in cold environments and especially when using fluid with certain temperature requirements.

Figure 29:
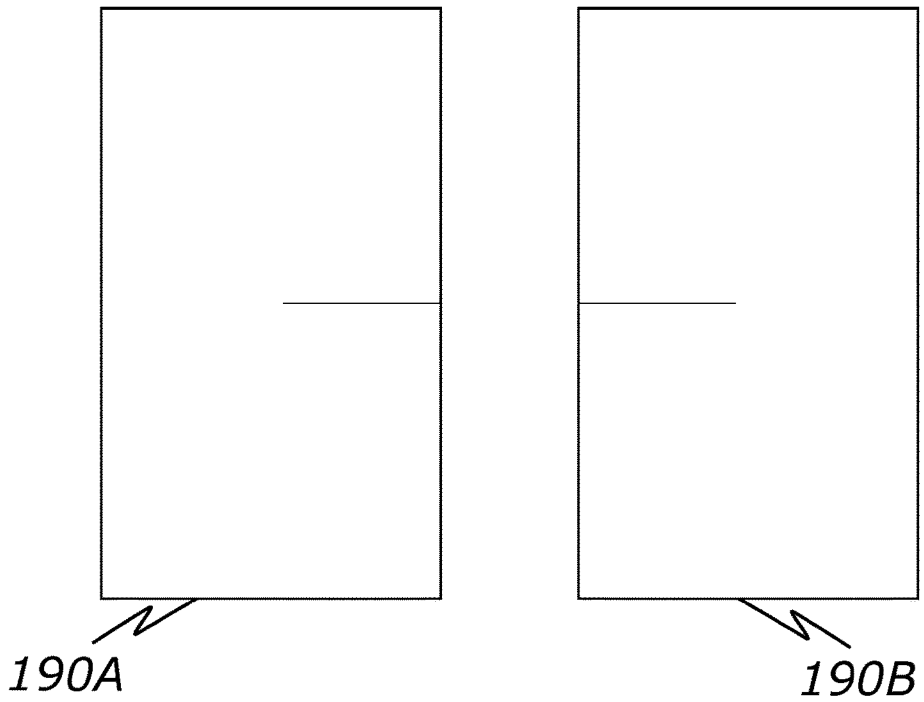
FIG. 29 is a view of baffle components.
Figure 30:
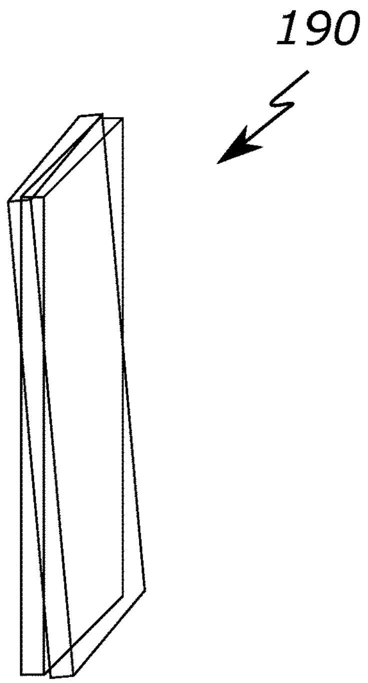
FIG. 30 is a view of a collapsed baffle.
Figure 31:
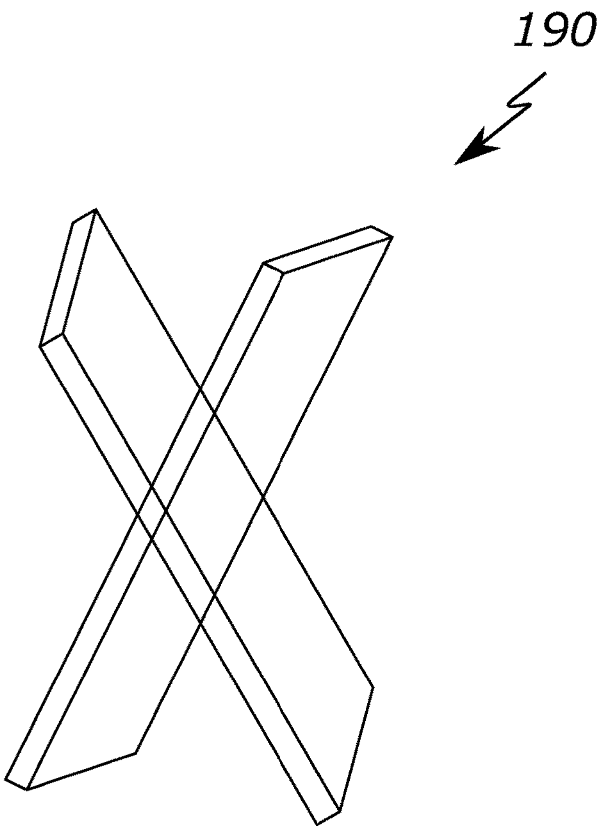
FIG. 31 is a view of an expanded baffle.

While the previously mentioned baffle may take many forms, one example can be seen in FIGS. 29-31 in which two sheets 190A and 190B of material are engaged with each other, such as with slots extending partially along a width of both sheets. The slots can be engaged with each other forming a baffle 190 that can be compressed or folded to a relatively narrow planar shape for insertion into the fluid tank 108 and then can be expanded to a larger width (e.g., an "X" like shape) within the fluid tank 108. The sheets 190A and 190B may be composed of a relatively non-reactive material such as polypropylene to withstand both high and low pH. The baffle may be helpful for preventing sloshing of fluid within the tank, among other functionalities. Other baffle shapes are also possible.

The fluid tank assembly 104 may further include a hose rack 112 on which the fluid conveying structure 109 can be wrapped around and stored. The rack may be fixed to one of several different locations, such as around the opening 110 of the fluid tank 108. The rack 112 may include a shape that upwardly curves such that it prevents the wrapped fluid conveying structure 109 from falling off during normal use and storage.

The fluid tank assembly 104 may further include supports for mounting the motorized fluid pump 100 on the back of a user. For example, backpack shoulder straps 130 and a waist support 132 may be attached at various locations to the fluid tank assembly 104 (e.g., to the fluid tank 108, a manifold support structure 126, and/or other locations). Either of the straps 130 or support 132 may include a structure that can removable connected to the handle assembly 106 or adjacent region so that the handle assembly and any attached nozzle or extension may be stored when not used.

The fluid tank assembly 104 may also include a manifold support structure 126 that is shaped to support and releasably secure the pump manifold 102. For example, the manifold support structure 126 may include a vertical framework 126A that permanently or removably attaches to the fluid tank 108, as well as a horizontal framework 126B (e.g., a horizontal platform or surface) that is connected to the vertical framework 126A.

The pump manifold 102 may be positioned on the horizontal framework 126B and releasably secured via one or more attachment mechanisms which can be used together in any combination. For example, one or more latches 134 (FIGS. 2,16), such as one or two, may attach the pump manifold 102 to the horizontal framework 126B (e.g., each latch 134 may be fixed to locations 126D on the horizontal framework 126B and latch onto a portion of the pump manifold 102).

In another example of attachment mechanisms, mating features (e.g., grooves, ridges, may be included on the bottom or lower sides of the pump manifold 102 and on the top of the horizontal framework 126B. For example, the bottom of the pump manifold 102 may include downwardly extending ridges 114B (FIG. 16) on its left and right sides that can be horizontally slid onto or vertically engage with edges 126C (FIG. 15) of the horizontal framework 126B. The vertical framework 126A may include one or more projecting elements 126E (e.g., pins, pegs, posts, or similar structures) that are positioned to engage mating holes in the back of the pump manifold 102. Straps may also or alternatively may be used, such as by extending through loops or similar passages of the manifold support structure 126 and on the pump manifold 102. The straps may include latching buckles that may disengage the pump manifold 102 from the manifold support structure 126.

While the manifold support structure 126 is described as being removably attachable to the pump manifold 102, it may either be permanently fixed to the fluid tank 108 or the fluid tank 108 may also be removably attached to the support structure 126 (e.g., attached to the vertical framework 126A). Similar attachment mechanisms as previously discussed may be used in such a configuration to allow the fluid tank 108 to be secured and released as needed.

The pump manifold 102 includes several ports extending from its outer housing 114 that allow for connection to various locations of the fluid tank 108 and the fluid conveying structure 109. Each of these ports may include an end fitting that allows connection and release to hydraulic conduits, such as so-called quick connect hydraulic fittings. In one example, the quick connect hydraulic fittings are located on the ends of the hoses that directly connect to the ports of the pump manifold 102. The opposite ends of the hoses may optionally also have quick connect hydraulic fittings on their ends.

A first hydraulic port 120 connects to hose 118 which in turn connects to the opening 108B at the bottom portion of the fluid tank 108. This allows fluid within the cavity of the fluid tank 108 to be sucked into the hose 118 and into the port 120 of the pump manifold 102 when used for spraying or recirculation, as discussed further below.

A second hydraulic port 122 connects to hose 116 and to opening 108A at the top portion of the fluid tank 108. When the pump manifold 102 is set to its recirculation mode, fluid from opening 108B of the fluid tank 108 is drawn into the pump manifold 102 as previously described and then pumped through hose 116, through opening 108A, and back into the cavity of the fluid tank 108. This recirculation mode can be turned on, for example, by adjusting a mode interface element, such as the knob 124 (FIG. 4) on the side of the housing 114 of the pump manifold 102 (e.g., the knob 124 can be rotated). Once set to circulation mode, the pump manifold 102 may continuously remove and return fluid to the tank or may periodically recirculate the fluid based on predetermined time periods (e.g., repeating segments of 2 minutes of recirculation followed by 5 minutes of no recirculation) and/or based on sensor readings (e.g., temperature of the fluid) and/or based on known characteristics of the fluid being used in the fluid tank 108 (e.g., a switch or input to indicate a slurry vs. non-slurry).

A third hydraulic port 129 and a fourth electrical port 128 connect to the fluid conveying structure 109 to communicate fluid and electrical signals/data between the handle assembly 106. The fluid conveying structure 109 may be composed of a hydraulic tube 166 (e.g., with quick connect fittings on each end), an electrical cable 164 (e.g., USB cable), and an outer sleeve 161 that is positioned over most of the tube 166 and cable 164, leaving its ends exposed for connection purposes. Alternatively, the tube 166 and cable 164 may be left separate from each other. While the fittings on the ends of the tube 166 and cable 164 may be separate from each other, a single fitting on each end that integrates both the hydraulic and electrical connections is also possible. The electrical port 128 may be wired to or in communication with the controller assembly 144 which is described in greater detail later and is located in a position such that it is not damaged when the pump 100 is dropped on the ground.

When the mode interface element, such as the knob 124 (FIG. 4) on the side of the housing 114 is set to a spraying mode, fluid is sucked from the opening 108B of the fluid tank 108, through hose 118, into hydraulic port 120, and then out of port 129, into hydraulic tube 166, into a hydraulic passage in the handle assembly 106, and out of a nozzle 107A. Additionally, electrical signals and power are communicated through cable 164 (e.g., for a battery status indicator and/or a Hall effect sensor in the handle assembly 106).

FIGS. 10-14 illustrate various views of the inside of the pump manifold 102 with the outer housing 114 removed. The pump manifold 102 may include, in one example, an electric motor 136, an inline pressure sensor 140, a gear pump 142, a pump speed controller 141, a diverting valve 138, a controller assembly 144, and a battery 146. These components can be electrically and/or hydraulically connected together as discussed further below. Note, for clarity purposes, electrical wires are generally not shown in these figures.

The controller assembly 144 may include a processor or microcontroller configured to execute software code stored in memory, memory (e.g., RAM, ROM, SSD, etc.), and interfaces to communicate with other components of the fluid pump assembly 100. Optionally, the controller assembly 144 may include a wireless interface to communicate with one or more external devices for upgrading firmware or adjusting certain pump settings (e.g., fluid type or viscosity, etc.).

The battery 146 is configured to power the electrical components of the fluid pump assembly 100, including the controller assembly 144. The battery 146 may be replaceable by opening a door 114A of the pump assembly housing 114 and removing a power connector 148. Hence, the battery 146 can be easily removed and replaced as needed. A fabric strip may be included such that at least partially wraps around the battery and facilitates removal of the battery when pulled.

Figure 12:
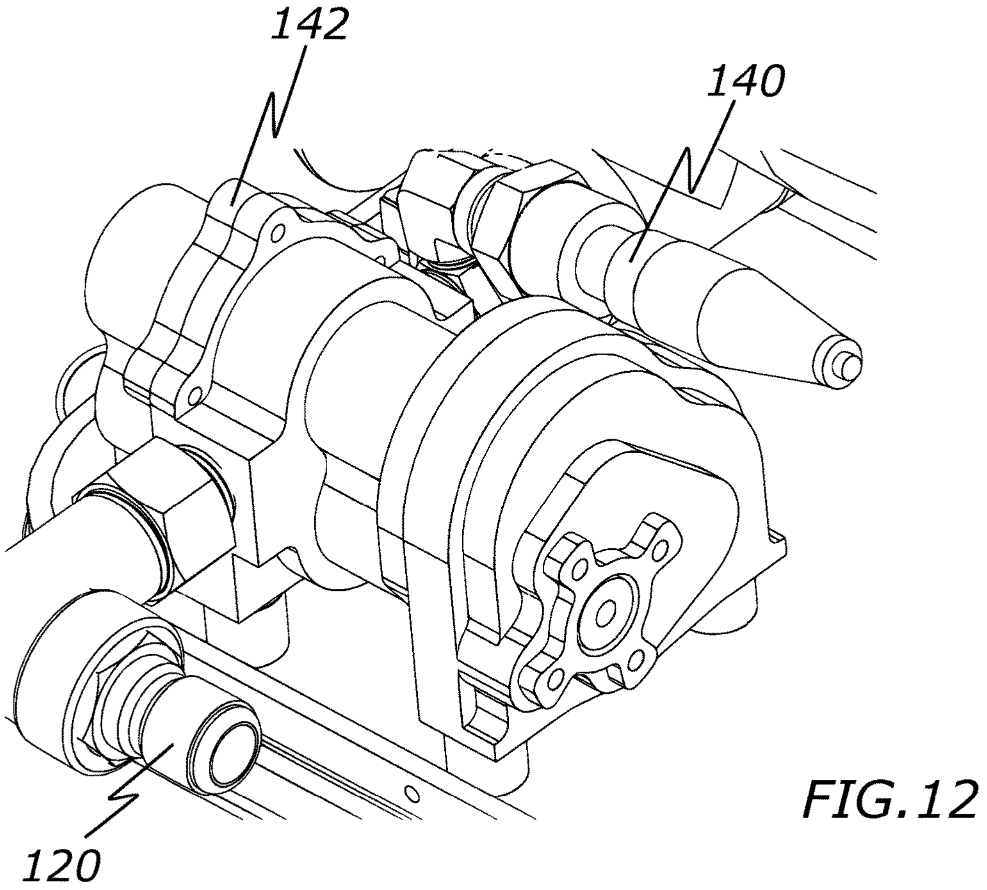
FIG. 12 is an internal view of the fluid sprayer device of FIG. 1.
Figure 15:
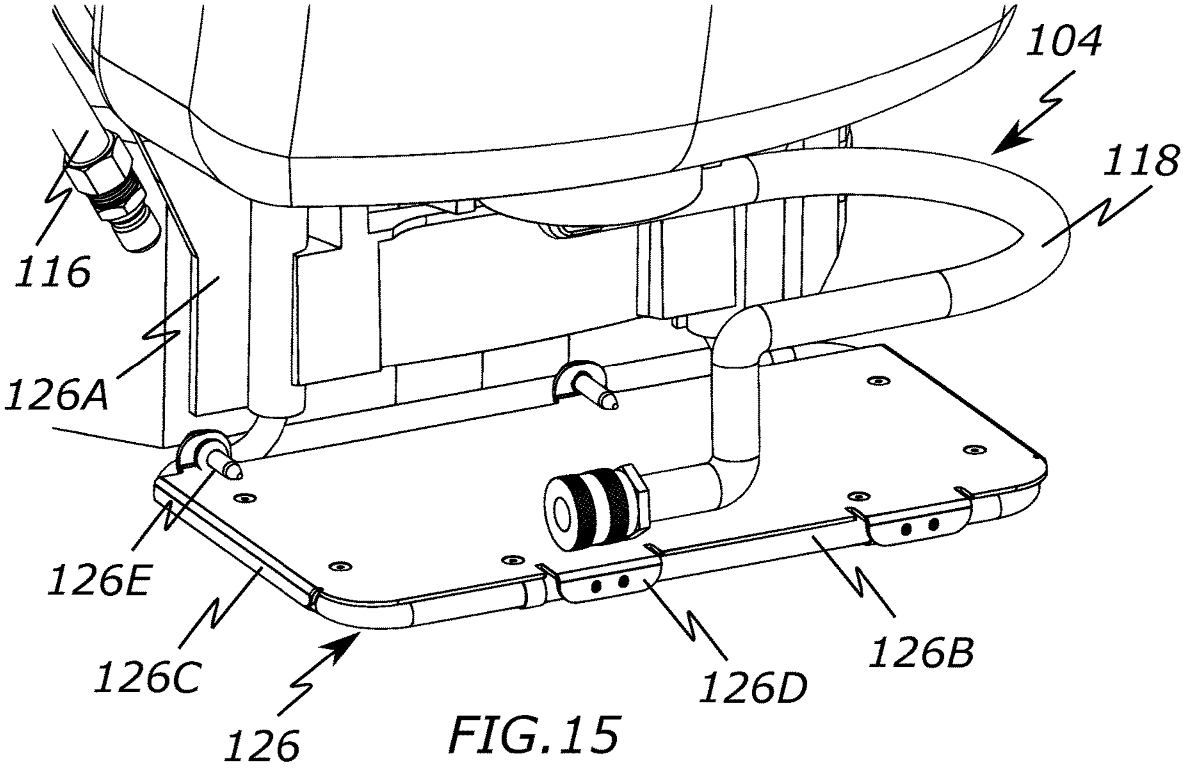
FIG. 15 is an enlarged view of the fluid sprayer device of FIG. 1 with the pump manifold removed.
Figure 16:
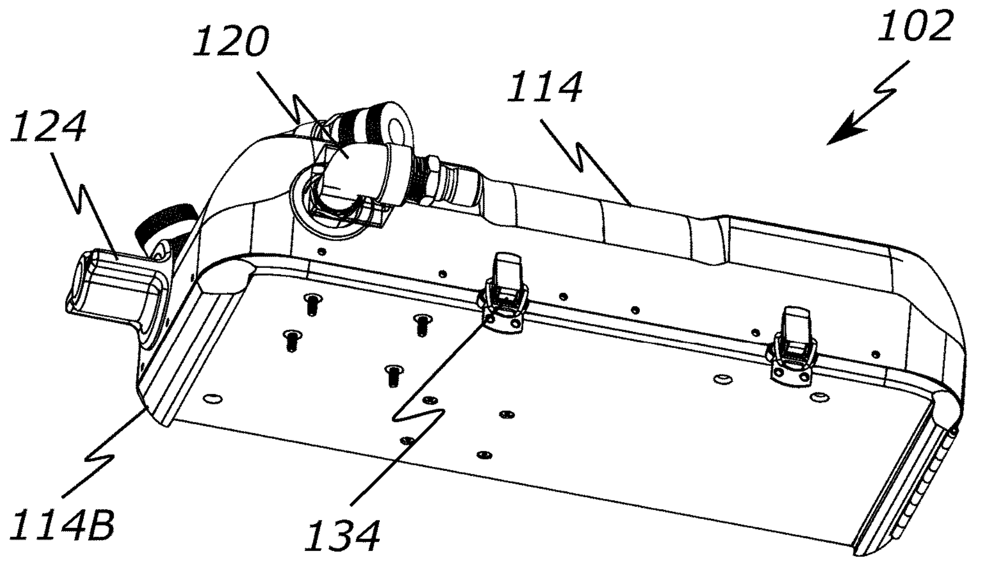
FIG. 16 is an enlarged bottom view of the pump manifold of the fluid sprayer device of FIG. 1.
Figure 17:
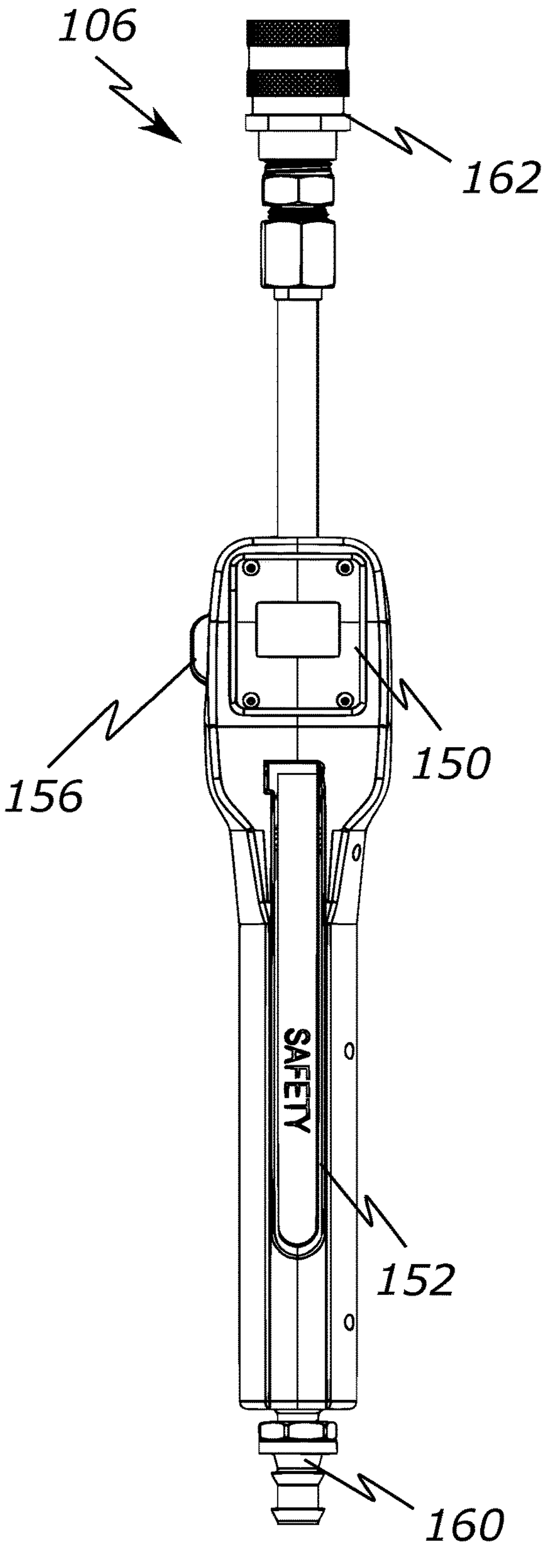
FIG. 17 is a view of a fluid sprayer handle.
Figure 18:
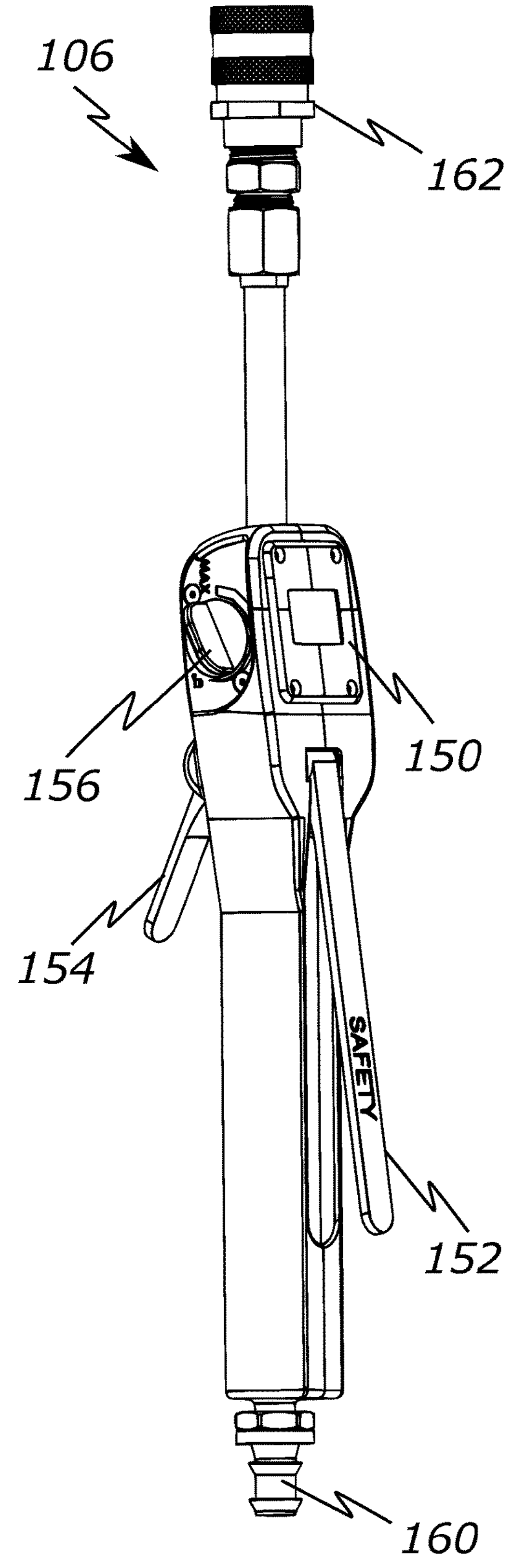
FIG. 18 is a view of a fluid sprayer handle.
Figure 19:
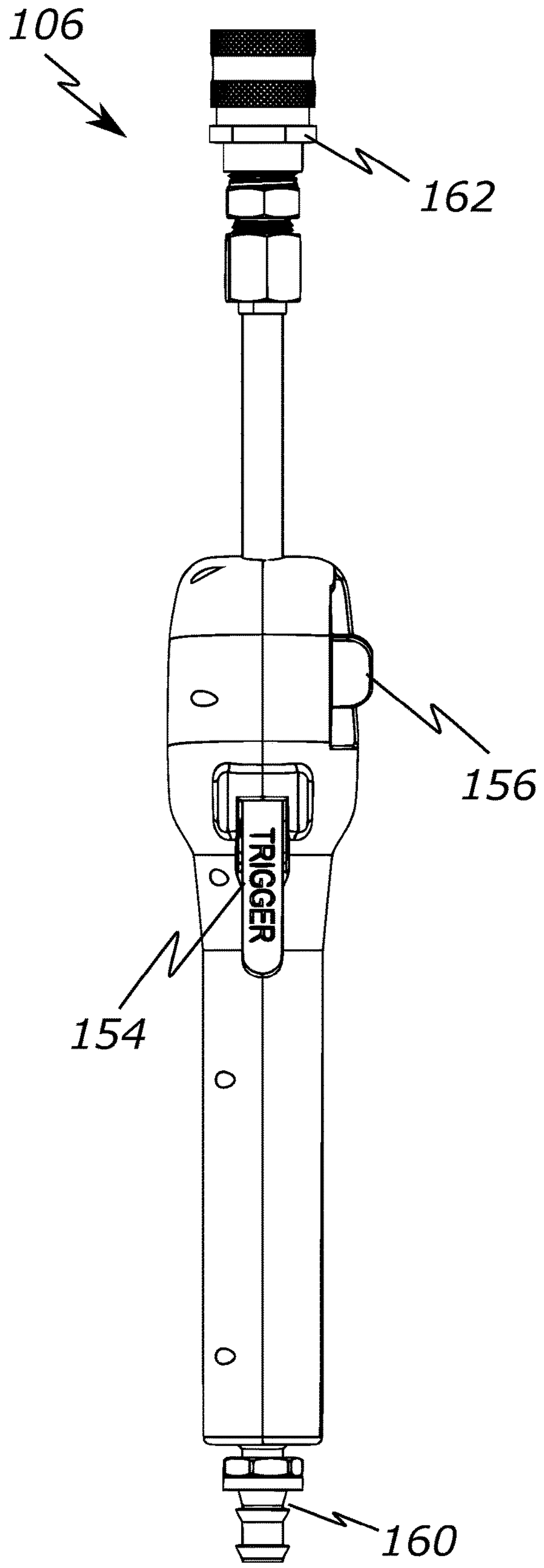
FIG. 19 is a view of a fluid sprayer handle.
Figure 20:
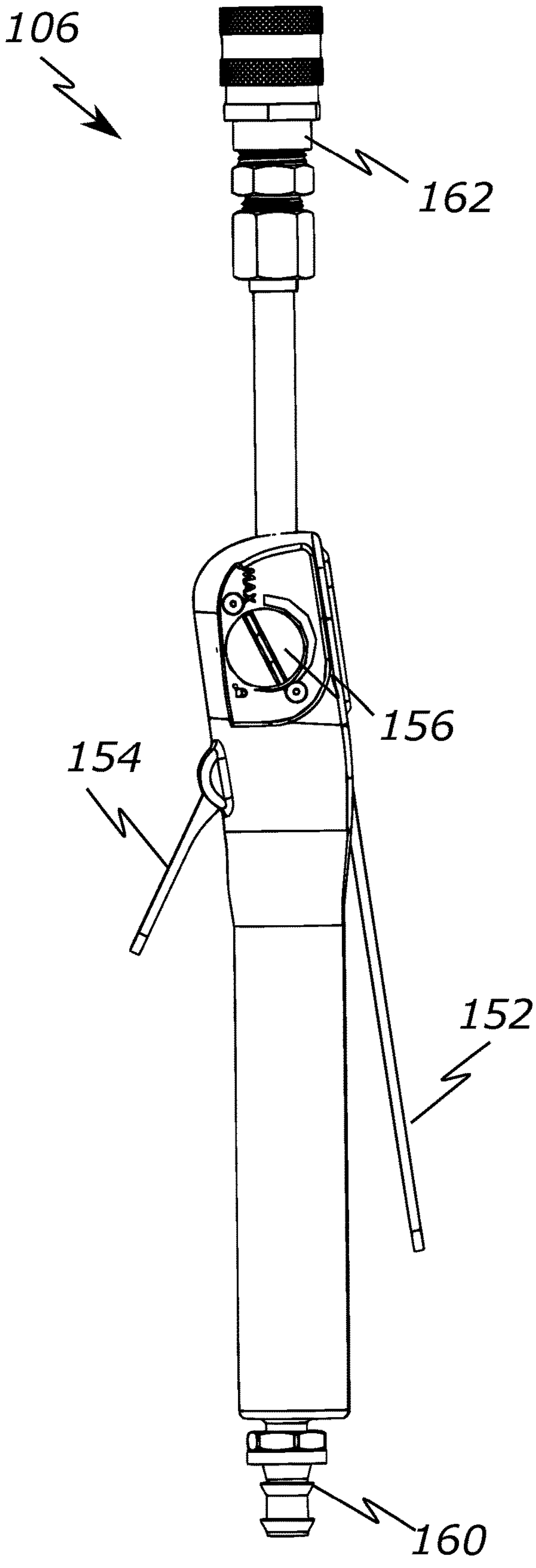
FIG. 20 is a view of a fluid sprayer handle.
Figure 21:
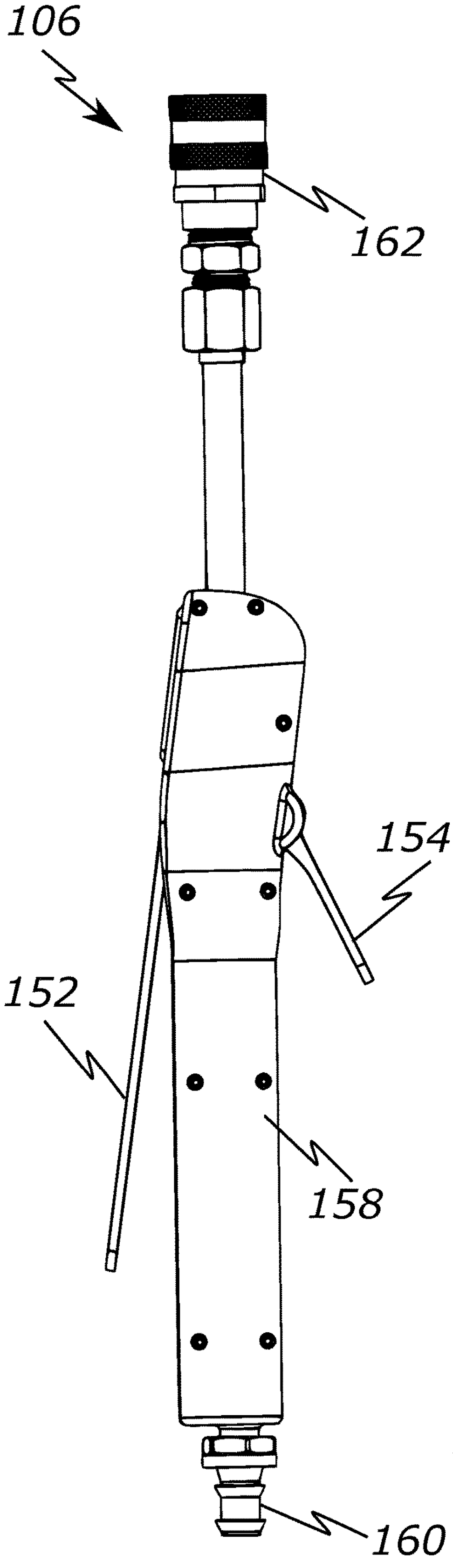
FIG. 21 is a view of a fluid sprayer handle.
Figure 22:
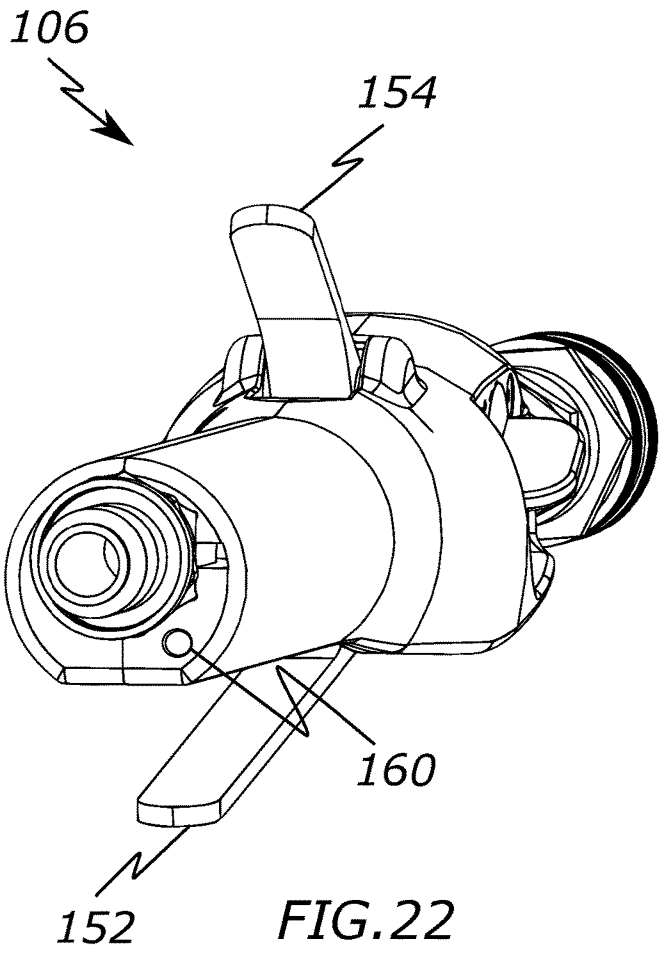
FIG. 22 is a view of a fluid sprayer handle.

The gear pump 142 is configured to pump fluid and may be further configured to pump fluid in two directions such that the fluid pump assembly 100 can spray fluid through the handle assembly 106 or suction fluid from the nozzle 107A and handle assembly 106 and into the fluid tank 108. FIG. 12 illustrates the gear pump 142 with the electric motor 136 hidden and an end gear box showing, while FIGS. 13 and 14 illustrate various housing elements hidden to show an interior of the gear pump 142. In one example, the gearbox is a 2 stage 3:1 ratio, making it a 9:1 gear ratio allowing for the motor 136 to be smaller (high RPM low torque) while supplying high torque to the gear pump 142. The gearbox may be directly connected with the pump 142 on one side and with the motor 136 on the other side (flat surfaces bottoming up against each other and screws connecting them) allowing for high shock and vibration resistance since there is no coupling that could get misaligned. This also contributes to the system being very quiet, which could be important when in hostile military environments. Dampeners may be used to mount the gearbox/pump/motor assembly to the bottom plate of the manifold 102 to dampen noise and vibration in both directions. Gear of the gearbox have relatively small teeth to allow for high RPM and smooth operation. A wide face and the use of hardened steel (for example A2) for the gears of the gearbox may allow the gearbox to offset high loads. Further, the gearbox may be filled with grease.

Several different gear pump configurations may be possible, such as a single gear pump or a multi gear pump. The present example includes a first drive gear 142A and a second idle gear 142B that are both driven to spin by the electric motor 136. The gears 142A and 142B may form a gap (e.g., an inclusive range of about 0.01 to 0.1 mm or about 0.05 mm) with the surface of their housing, creating a small passage around the gears 142A and 142B through which gas can travel. Since some chemicals may produce gas, this feature helps prevent pressure buildup. Further, the valve within the nozzle, as described elsewhere, may also be configured to open at a pressure to relieve gas buildup within the pump 100.

The housing of the gear pump 142 may be hydraulically connected to the port 120 and therefore in hydraulic communication with the cavity of the fluid tank 108. The housing of the gear pump 142 may also be connected to a second hydraulic passage that connects to several other components. First, this second hydraulic passage may be connected to an inline pressure sensor 140 which is electrically connected to the controller assembly 144 and thereby provides pressure sensor data or readings of the fluid pressure within the second hydraulic passage. These pressure readings are used by the controller assembly 144 to maintain a desired pressure of the fluid sprayed from the motorized fluid pump 100, as discussed further elsewhere.

The second hydraulic passage may be further connected to a diverting valve 138 which diverts the second hydraulic passage between either the port 129 to the handle assembly 106, or to the port 122 back into the fluid tank 108 for recirculation. The knob 124 may be connected to the diverting valve 138 such that rotation in a first position connects the second hydraulic passage to the port 129 and rotation in a second position connects the second hydraulic passage to the port 122. Further, the knob 124 may include a feature that activates or deactivates a sensor 124B (e.g., switch or button), depending on if the knob 124 is in the first or second position. The sensor 124B may be connected to the controller assembly 144 so that the controller assembly 144 may determine whether the knob 124 is positioned in the first position for recirculation or in the second position for spraying through the handle assembly 106.

The knob 124 may also include a power button 124A, such as at a center location of the knob 124, that is electrically connected to the controller assembly 144 so as to power on or power off the pump assembly 100. This location may be important since, during use, the fluid pump 100 will often be located on a user's back and therefore they may need to turn on or off the fluid pump 100 without being able to see the power button 124A. By placing the power button on the knob 124, and particularly at the center or middle of the end of the knob 124, it provides a large and distinctive "landmark" for a user's hands so that they can easily feel the knob 124 and therefore know where the power button 124A is located. Alternatively, the power button 124A may be located at other positions on the pump manifold 102.

As previously discussed, an electrical motor 136 may be coupled to the gear pump 142 to drive the first drive gear 142A. The electrical motor 136 may be electrically connected to the speed controller 141 which is configured to supply the necessary power to drive the electrical motor 136 at a desired speed and rotational direction. The speed controller 141 may also be electrically connected to the controller assembly 144 such that the controller assembly 144 may sending an electrical signal to the speed controller 141 indicating a desired speed and rotational direction of the motor 136 and the speed controller 141 will then supply the appropriate electrical signal to the motor 136 to cause the desired motor rotation.

Figure 25:
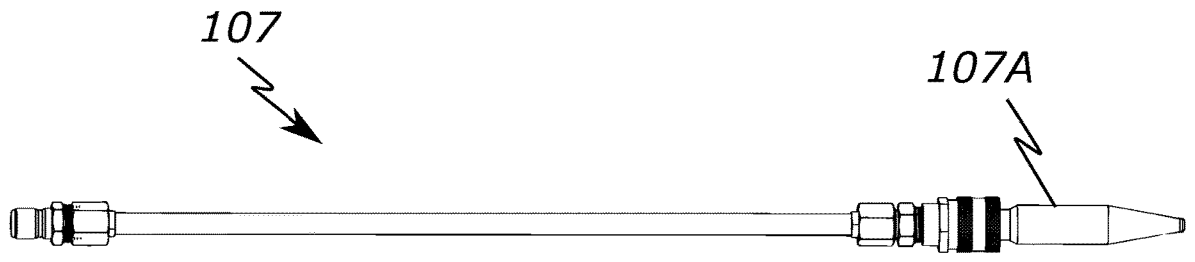
FIG. 25 is a view of a fluid sprayer handle.

FIGS. 17-22 illustrate various views of an example handle assembly 106. The handle assembly 106 may be gripped by the user and actuated to spray (or suction) fluid. In that respect, the handle assembly 106 may include a hydraulic passage that terminals with a proximal port/fitting 160 and a distal port/fitting 162. The proximal port/fitting 160 may be connected to hydraulic hose 166 of the fluid conveying structure 109, which itself may be connected to the port 129 of the pump manifold 102. The distal port/fitting 162 may be connected to a wand extension tube 107 (FIG. 25) which terminates in a nozzle 107A, or may terminate with only a nozzle 107A directly connected to the port/fitting 162. Depending on the usage, the user may prefer different extensions and nozzles for different usages (e.g., a wide angle spray, a narrow laminar flow for distance, or an end suitable for suction of liquid from a container).

The handle assembly 106 may actuate fluid flow either out of the pump assembly 100 or into the pump assembly 100 via the trigger 154 (or similar input mechanism such as a button, lever, slider, or thumbwheel). For example, pulling the trigger 154 towards the body of the handle assembly 106 may cause the pump manifold 102 to deliver fluid to handle assembly 106 to cause spraying. The handle assembly 106 may be further configured to cause suction of fluid into the hydraulic passage of the handle assembly 106, into the pump manifold 102, and into the fluid tank 108. For example, the trigger 154 may be moved away from the body of the handle assembly 106 (e.g., the opposite direction for spraying) to cause suction. Alternatively, the handle assembly 106 may include a switch or button that, when activated, causes suction when the trigger 154 is moved towards the body of the handle assembly 106. In some examples, it may be desirable for the suction pressure to be a predetermined, constant level. Hence, while the pressure level for spraying may vary depending on how far the trigger 154 is depressed, the suction pressure level may be relatively constant no matter how far the trigger 154 is moved away from the handle relative to its default position. Alternatively, the suction may be variable similar to the spraying.

The handle assembly 106 may also include a safety trigger or lever (or other input device), such as lever 152 which must be depressed before the trigger 154 will actuate fluid flow. The safety lever 152 may be configured such that it must be depressed at all times the trigger 154 is actuated for fluid flow to occur, or may be configured such that it only is required to be depressed initially with the trigger 154 but may be later released.

The handle assembly 106 may also include an adjustment interface such as a knob 156 that may be adjusted to limit a maximum rate of flow of fluid into or out of the pump assembly 100. A guard member 158, such as an angled metal sheet or shield may be positioned over the knob 156 to prevent accidental adjustment.

The handle assembly 106 may also include a battery status indicator 150 that is in electrical communication with the controller assembly 144 of the pump manifold 102. Hence, the controller assembly 144 may monitor the charge level of the battery 146 and transmit an electrical signal to communicate that battery level. The battery status indicator 150 may be a numerical display (e.g., LCD that displays a battery percentage value), a plurality of lights or LCD symbols (e.g., an array of LEDs), or similar displays.

The trigger 154 may be connected to an electronic sensor that relays its relative position to the controller assembly 144 such that the controller assembly 144 may activate the pump manifold 102 and pump or suction fluid at a specific pressure. For example, the sensor may be a Hall effect sensor that senses a magnet or similar material connected to the trigger 154. Hence, as the trigger 154 is moved by the user, the sensed value of the Hall effect sensor also changes. Additionally, since the Hall effect sensor does not rely on electrical contact between the trigger 154 and the sensor, it may be more resistant to water/fluid infiltration. Since the trigger 154 may have many different positions or levels of being depressed or even pushed away from the body for creating suction, similarly the sensor (e.g., Hall effect sensor) may provide a range of possible sensor values to the controller assembly 144.

Generally, the user will move the trigger 154 to a desired spray level and the sensor will sense the position change of the trigger 154 and then send sensor signals to the controller assembly 144 via the cable 164. The controller assembly 144 will then convert the position data of the sensor to a desired fluid pressure level (e.g., via an equation or lookup table) that it intends to achieve, at least within the hydraulic passages of the pump manifold 102. The controller assembly 144 communicates with the speed controller 141 to increase the rotational speed of the motor 136 in a specific direction while also monitoring the pressure sensor data from the inline pressure sensor 140. When the controller assembly 144 determines that the pressure sensor data from the inline pressure sensor 140 is equal to (or within a certain range of) the desired fluid pressure level, the controller assembly 144 will signal to the speed controller 141 to maintain the current speed of the motor 136. While the trigger 154 maintains its position, the controller assembly 144 may continuously monitor pressure sensor data from the inline pressure sensor 140 to maintain desired fluid pressure level (e.g., if the consistency or viscosity of the liquid changes somewhat). If the position of the trigger 154 is changed, the processes may be started again. Hence, the pump assembly 100 may expel (or suction) fluid at a known and consistent pressure levels without regard for the consistency, thickness, viscosity, or other characteristics of the fluid. It should be further noted that the fluid within the fluid tank 108 remains under normal atmospheric pressure and pressure within the cavity of the tank 108 is not increased, as in some other fluid spraying devices.

Note that the sensor of the trigger 154 may also provide sensor data that indicates if the trigger 154 is moved towards the body of the handle assembly 106 (e.g., for spraying) or if the trigger 154 is moved away from the body of the handle assembly 106 (e.g., for suction of fluid into the tank 108). Hence, the controller assembly 144 may also determine direction of rotation of the motor 136 and gear pump 142 based on a trigger position relative to a neutral or intermediate position of the trigger 154.

The controller assembly 144 may also implement an over-pressure limit feature that provides a predetermined pressure limit for the hydraulic passages of the fluid pump 100 to prevent bursting of connections, passages, or other components from pressure. In one example, the controller assembly 144 monitors pressure sensor data from the inline pressure sensor 140 for pressure data equal to or exceeding a predetermined pressure threshold (e.g., stored in memory and 100 PSI). If that pressure threshold is reached, the controller assembly 144 may prevent further speed increases of the motor 136 and may even reduce the speed of the motor 136 if necessary to maintain pressure below the pressure threshold.

A similar feature may also be implemented for electrical current. The electrical current being drawn from the battery 146 may be monitored for a predetermined current threshold and, if the predetermined current level is reached or exceeded, the speed of the motor 136 is reduced. This may prevent battery management systems in the battery 146 or elsewhere from turning off current to the entire fluid pump 100. In one example, the controller assembly 144 may store this predetermined current level and monitor the current usage, reducing or limiting the speed of the motor 136 as needed when the predetermined current threshold is reached.

The safety lever 152 and the maximum flow rate adjustment knob 156 may also include sensors that are also in communication with the controller assembly 144, allowing the controller assembly 144 to factor these sensor values in as needed. For example, if the controller assembly 144 receives a sensor signal from the sensor of the trigger 154 indicating that is has been depressed to a certain level, it will check if the sensor of the safety lever 152 indicates that it is also depressed. If so, it will proceed with activating the speed controller 141 and motor 136 as previously described. If not, it will not proceed with activating the speed controller 141 and motor 136 as previously described.

Figure 23:
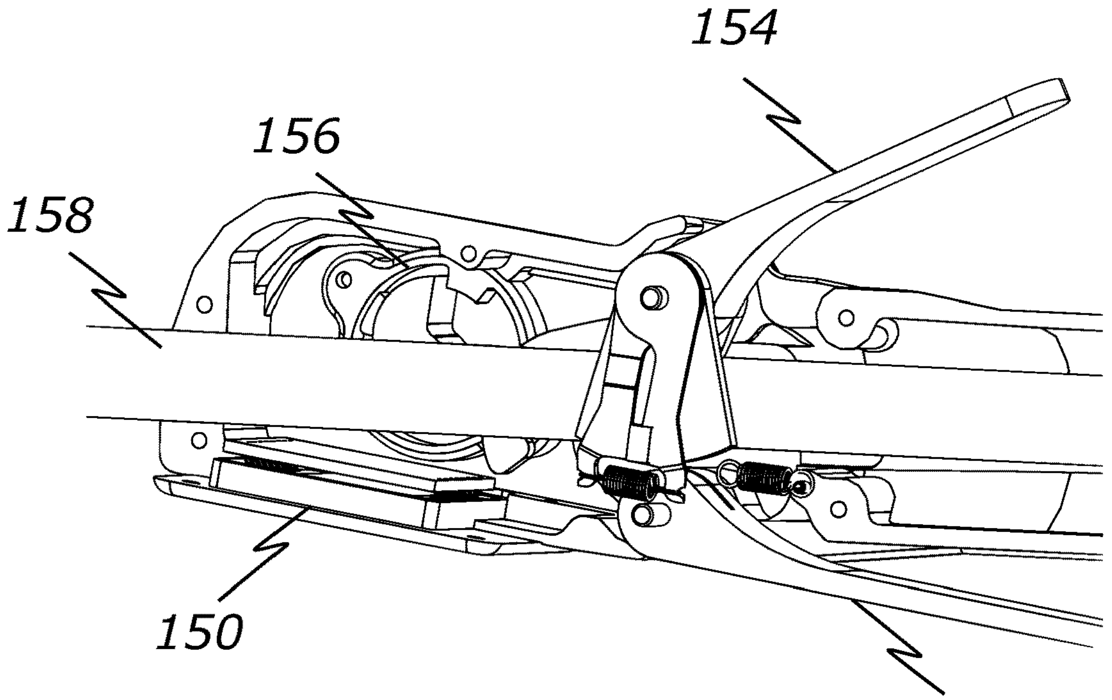
FIG. 23 is a view of an interior of a fluid sprayer handle.
Figure 24:
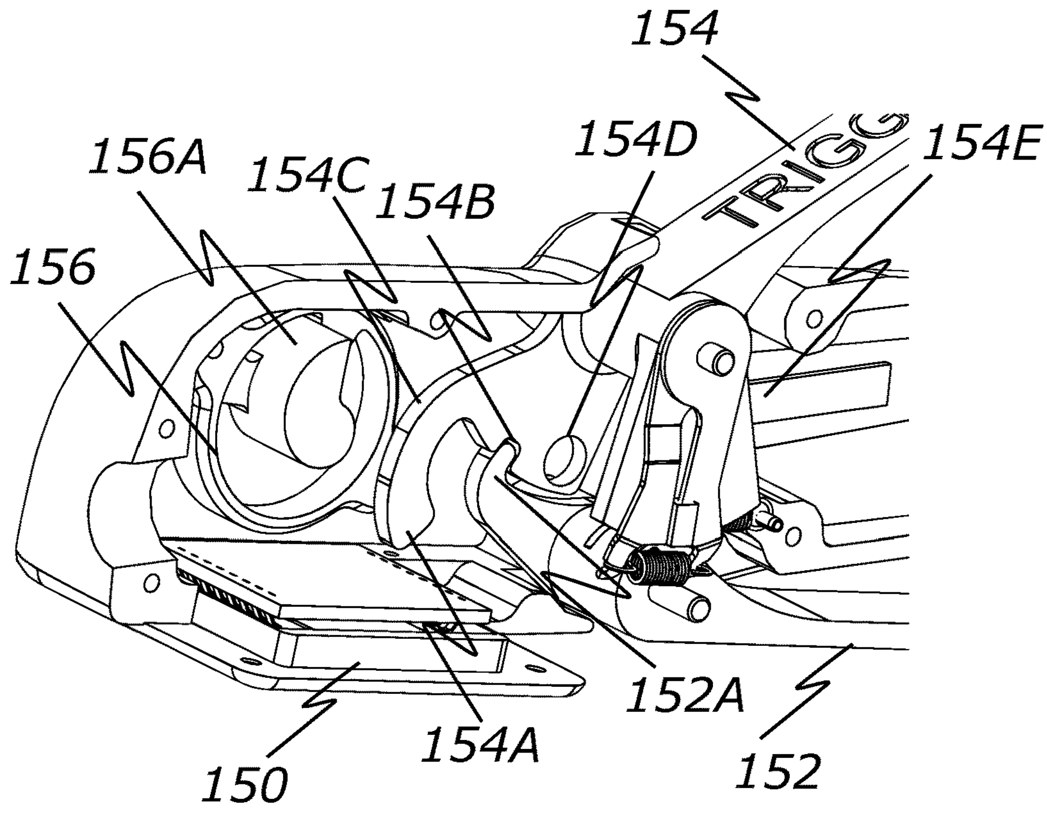
FIG. 24 is a view of an interior of a fluid sprayer handle.

Alternatively, the safety lever 152 and the maximum flow rate adjustment knob 156 may be physical mechanisms, as seen in FIGS. 23 and 24. In the example of FIGS. 23 and 24, half of the outer housing of the handle assembly 106 removed and in FIG. 24 the hydraulic tube or passage 158 is also hidden. The trigger 154 may include an inner portion with a groove or notch 154B into which a finger member 152A of the safety lever 152 is shaped to extend into when the trigger 154 is in a neutral or intermediate position. When the safety lever 152 is depressed, it moves the finger member 152A out of or disengages the groove/notch 154B and therefore physically allows the trigger 154 to be moved by the user. Both the safety lever 152 and the trigger 154 may be biased (e.g., spring biased) to return to positions that re-engage the groove/notch 154B with the finger member 152A.

Further, the inner portion of the trigger 154 may have an elongated region 154C that may optionally be curved that moves within the handle assembly 106 as the trigger 154 is moved. A rotational stop 156A is connected to the maximum flow rate adjustment knob 156 and is shaped such that, as the knob 156 is rotated, it moves portions of the stop 156A closer to or further away from the elongated region 154C. Hence, depending on the rotational position of the knob 156 and the stop 156A will physically stop or limit movement of the trigger 154. FIG. 24 also illustrates a location 154D (e.g., an opening or recessed area) on the inner portion of the trigger 154 at which a magnet can be mounted which can then be sensed by a Hall effect sensor, as discussed elsewhere in this specification. The Hall effect sensor may be located in several different locations, including proximally of the magnet in area at location 154E as seen in FIG. 24. The magnet may be diametrically magnetized, as this configuration may simplify mounting and simplifies the magnetic field, allowing the use of an easier to calculate algorithm for the trigger distance/position calculation.

In a similar example, the controller assembly 144 may constantly or periodically receive a sensor value for the maximum flow rate adjustment knob 156 and will limit a maximum pressure that it will adjust the pump manifold 102 to based on the position of the knob 156 when performing the previously described pumping process. For example, in the previously described process for determining a pressure level of the fluid based on the position of the trigger 154, the process further includes the controller assembly 144 converting the sensor data from sensor of the adjustment knob 156 (or similar input) to a maximum pressure level, comparing the desired fluid pressure level from the sensor of the trigger 154, and limiting the desired fluid pressure level to a value less than the maximum pressure level.

In one example, the battery status indicator 150 may also be a display (e.g., LCD) that displays other data. For example, the indicator 150 may also or alternatively display a current fluid pressure, a fluid temperature (e.g., via temperature sensors in the fluid tank 108 or along the hydraulic path), prior shock values, estimated battery time remaining, a fluid level within the fluid tank 108, and/or estimated viscosity of the pumped fluid).

The hydraulic path within the handle assembly 106, the extension 107, nozzle 107A may include a valve, such as a ball valve, that remains closed when not under significant pressure, but opens when under a relatively higher pressure. Such a valve may open with both spraying and suction (i.e., a bi-directional valve) or only open with pressure from a single direction. Such a valve may help prevent dripping from fluid leftover within the hydraulic path of the pump assembly 100 when spraying or suction stops. Preventing such dripping may be particularly helpful if the fluid being used with the pump assembly 100 is harmful or dangerous (e.g., a high or low pH value).

Since some example uses of the motorized fluid pump 100 may include spraying fluid with relatively high or low pH values or other potentially corrosive characteristics, it may be desirable for at least the components that contact fluid regularly to be composed of a material that is generally resistant to corrosion or degradation under moderately high or low pH values. For example, metal components (e.g., hydraulic connection fittings, pump components, sensor components, hydraulic passages, etc.) may be composed of stainless steel or anodized aluminum while other components (e.g., the fluid tank 108) may be composed of a relatively non-reactive polymer such as polypropylene. In one example, 440C hardened stainless steel material/parts may be used for high abrasion resistance in at least some components (e.g., gears in gear pump) whereas components experiencing less abrasion may use a more corrosion resistant grade of stainless.

The motorized pump assembly 100 may have one or more sensors located in the fluid tank 108, on the outside of the fluid tank 108, or near the fluid tank 108 that send sensor data to the controller assembly 144 and allow it to monitor what conditions the tank and/or its contents may have been exposed to and then determine if an alert should be generated. For example, the controller assembly 144 may monitor shock sensor data from a shock sensor and compare that to a predetermined range of shock values, alerting a user (e.g., via the display 150, an audio alert, LED lights, or similar mechanisms) if that predetermined range of shock values has been exceeded. In a similar example, the controller assembly 144 may monitor temperature data from a temperature sensor on or in the fluid tank 108, alerting a user (e.g., via the display 150, an audio alert, LED lights, or similar mechanisms) if that predetermined range of temperature values has been exceeded. The predetermined temperature range may be preconfigured for specific chemicals that may be commonly used with the pump assembly 100, such as decontamination chemicals (e.g., a temperature range of 5 to degrees Celcius for M333).

Temperature sensors may also be included on the motor, controller, and/or inside the pump manifold 102 such that the manifold 102 may alert a user if any of the components overheat and optionally may reduce or prevent operations until temperature is reduced.

The pump manifold 102 may be configured to be water resistant, especially during rain. In one example, the manifold housing 114 is shaped to cover over its bottom plate to help keep water out. In another example, the battery door may have a gasket configured to prevent water ingress. In another example, some or all of the electrical components are waterproof (e.g., potted).

Figure 27:
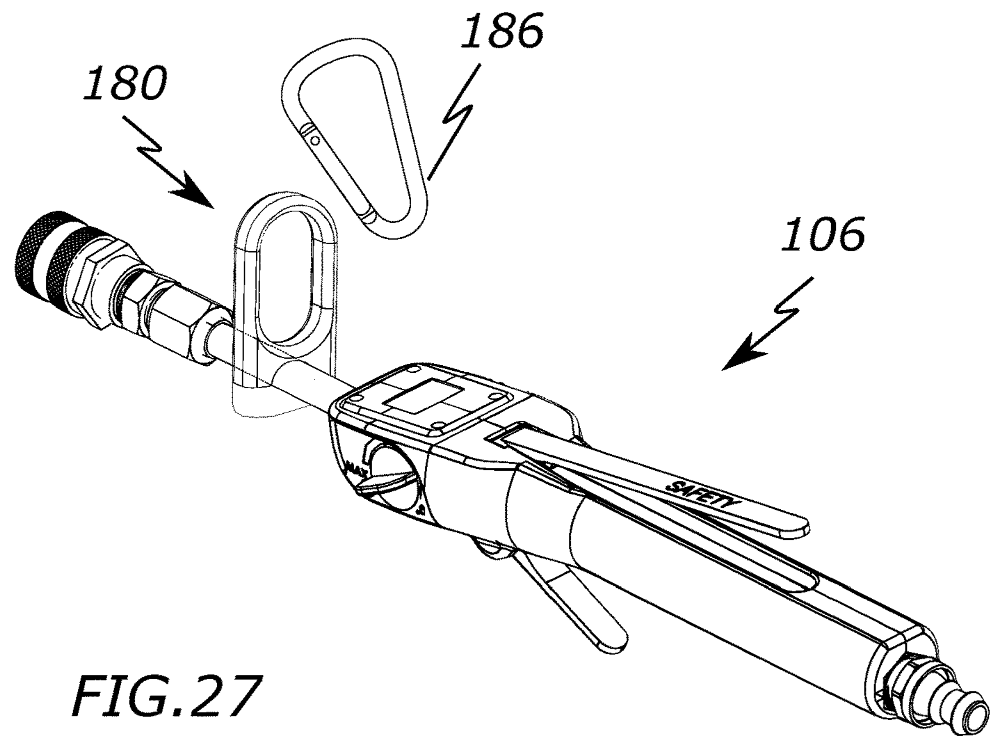
FIG. 27 is a view of a handle assembly with a loop support.
Figure 28:
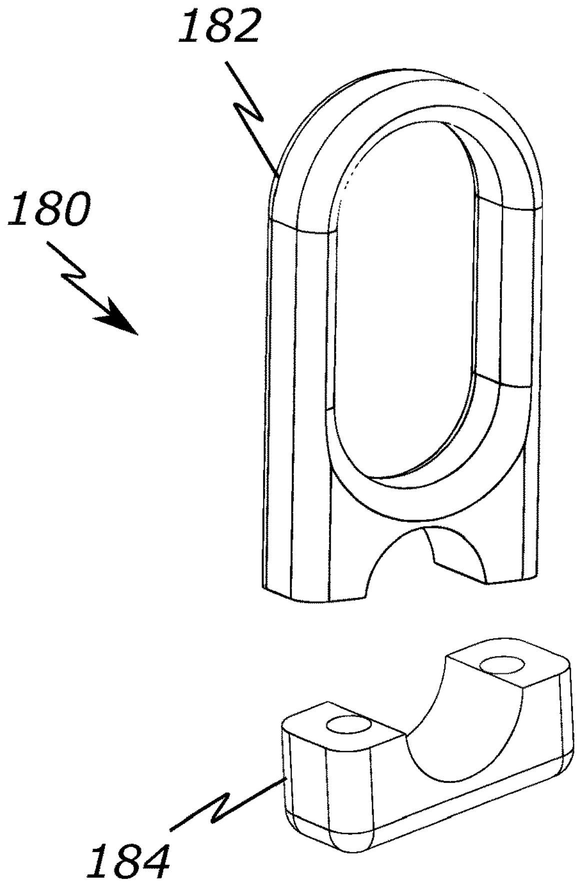
FIG. 28 is a view of a loop support.

The fluid pump 100 may also include a support structure for securing and supporting the handle assembly 106 when not in use so as to free both of the user's hands for other purposes. Such a support structure may have a variety of different designs that releasable engage the handle assembly 106 to a portion of the pump assembly 100, such as the shoulder straps 130, waist band 132, fluid tank 108, or the pump manifold 102. FIGS. 27 and 28 illustrate one specific example of a support structure 180 that comprises a loop portion 182 and a bottom clamp portion 184. Both portions 182 and 184 may include partially curved regions that are shaped to mate or fit around the exposed hydraulic tube of the handle assembly 106 (e.g., distally of the trigger and display). Screws or bolts may pass through apertures in both portions 182, 184 to engage the portions and clamp them together around the hydraulic tube. The loop portion 182 may also form a loop which is sized to removably connect to a clip 186 (e.g., a carabiner clip) that is connected to another portion of the fluid pump 100, such as on the shoulder strap 130. Hence, the user may easily clip and unclip the handle assembly 106 as needed and each individual may use their preferred mounting position of the clip on the harness, varying attachment points from shoulder straps to hip holster based on individual preference. Alternately, a loop portion may be formed on the handle assembly 106 in other ways, such as integrally with the housing of the handle assembly 106.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A portable motorized fluid sprayer comprising:

a fluid tank configured to contain fluid;

a pump manifold comprising a pump, an electric motor operatively coupled to the pump, and a controller operatively connected to the electric motor;

an inline pressure sensor arranged to sense pressure within a hydraulic passage of the pump manifold; and, a fluid conveying structure hydraulically connected to the pump; the fluid conveying structure further including a handle, a trigger, and a trigger sensor sensing a position of the trigger;

wherein the controller adjusts a speed of the electric motor based on a comparison of trigger sensor data from the trigger sensor and pressure sensor data from the inline pressure sensor;

wherein the controller is configured to operate the motor to pump fluid from the fluid tank out of the fluid conveying structure.

2. The portable motorized fluid sprayer of claim 1, wherein the pump is a gear pump.

3. The portable motorized fluid sprayer of claim 1, wherein the pump manifold is removably connected to the fluid tank.

4. The portable motorized fluid sprayer of claim 3, further comprising a support structure removably connecting the fluid tank to the pump manifold.

5. The portable motorized fluid sprayer of claim 4, wherein the support structure comprises a bracket or shelf and wherein the pump manifold is connected to the support structure via one or more of latches, mating grooves, mating pins/holes, screws, and bolts.

6. The portable motorized fluid sprayer of claim 5, wherein the support structure is permanently fixed to the fluid tank or is removably connected to the fluid tank.

7. The portable motorized fluid sprayer of claim 1, wherein the fluid tank is at least partially composed of flexible material and may have an expanded configuration and a compressed configuration that is thinner than the expanded configuration.

8. The portable motorized fluid sprayer of claim 1, wherein the pump manifold has a first mode of operation spraying fluid from the fluid tank out of the fluid conveying structure, a second mode of operation recirculating fluid from a first opening of the fluid tank to a second opening of a fluid tank.

9. The portable motorized fluid sprayer of claim 1, wherein the controller converts position data from the trigger sensor to a desired fluid pressure level.

10. The portable motorized fluid sprayer of claim 9, wherein the controller adjusts the speed of the electric motor until a sensed pressure value from the inline pressure sensor is equal to or within a predetermined range of the desired fluid pressure level.

11. The portable motorized fluid sprayer of claim 10, wherein the handle further comprises a safety lever; wherein the controller prevents spraying from the fluid conveying structure until the safety lever is actuated.

12. The portable motorized fluid sprayer of claim 10, wherein the handle further comprises a maximum flow rate interface; wherein the controller limits a maximum flow rate during spraying from the fluid conveying structure based on a position of the maximum flow rate interface.

13. The portable motorized fluid sprayer of claim 10, wherein the trigger has a neutral position that is unmoved by a user and is movable from the neutral position toward the handle and from the neutral position away from the handle; wherein moving the trigger towards the handle from the neutral position causes the portable motorized fluid sprayer to spray fluid from the fluid conveying structure, and wherein moving the trigger away from the handle from the neutral position causes the portable motorized fluid sprayer to suction fluid into the fluid tank from the fluid conveying structure.

14. The portable motorized fluid sprayer of claim 13, wherein the controller determines a direction of operation of the motor based the position data of the position of the trigger relative to the neutral position.

15. The portable motorized fluid sprayer of claim 13, wherein a fluid spraying pressure from the handle increases as the trigger is moved towards the handle from the neutral position.

16. The portable motorized fluid sprayer of claim 15, wherein a fluid suction pressure from the handle is constant when the trigger is moved away from the handle from the neutral position.

17. The portable motorized fluid sprayer of claim 1, further comprising two shoulder straps configured to support the portable motorized fluid sprayer on a back of a user.

18. The portable motorized fluid sprayer of claim 1, wherein the pump is configured to recirculate fluid by removing fluid from the fluid tank and then returning the removed fluid back to the fluid tank.

19. The portable motorized fluid sprayer of claim 1, wherein the controller is configured to:

sense a position of the trigger;

convert a sensed position value of the trigger to an intended fluid pressure value; and, adjust a speed of the electric motor based on a comparison between the intended fluid pressure value and an actual pressure value from an inline pressure sensor arranged to sense pressure within a hydraulic passage of the pump manifold and until the pressure within the hydraulic passage reaches the intended fluid pressure value.

20. The portable motorized fluid sprayer of claim 1, wherein the controller is configured to:

monitor for a predetermined current draw value from a battery powering the portable motorized fluid sprayer; and, reduce a speed of the electric motor if the predetermined current draw value is reached or exceeded.

21. The portable motorized fluid sprayer of claim 1, wherein the controller is configured to:

monitor for a predetermined tank level value within the fluid tank; and, stop the electric motor if the predetermined tank level value is reached.

22. The portable motorized fluid sprayer of claim 21, wherein the controller is configured to stop the electric motor from a suction operation if the predetermined tank value is reached.

23. A portable motorized fluid sprayer comprising:

a fluid tank;

a pump assembly comprising a pump, an electric motor operatively coupled to the pump, and a controller operatively connected to the electric motor;

an inline pressure sensor sensing pressure within a hydraulic passage of the pump assembly; and, a fluid conveying structure hydraulically connected to the pump; the fluid conveying structure further including a handle, a trigger, and a trigger sensor sensing a position of the trigger;

wherein the controller is configured to:

sense a position of the trigger;

convert a sensed position value of the trigger to an intended fluid pressure value;

measure pressure within the hydraulic passage; and, adjust a speed of the pump until the pressure within the hydraulic passage reaches the intended fluid pressure value.

24. A portable motorized fluid sprayer comprising:

a fluid tank;

a pump assembly comprising a pump, an electric motor operatively coupled to the pump, and a controller operatively connected to the electric motor;

an inline pressure sensor arranged to sense pressure within a hydraulic passage of the pump assembly; and, a fluid conveying structure hydraulically connected to the pump assembly; the fluid conveying structure further including a handle, a trigger, and a trigger sensor sensing a position of the trigger;

wherein the trigger has a neutral position that is unmoved by a user and is movable from the neutral position toward the handle and from the neutral position away from the handle;

wherein moving the trigger towards the handle from the neutral position causes the portable motorized fluid sprayer to spray fluid from the fluid conveying structure, and wherein moving the trigger away from the handle from the neutral position causes the portable motorized fluid sprayer to suction fluid into the fluid tank from the fluid conveying structure.

* * * * *